United States Patent
Yamada et al.

(10) Patent No.: US 8,363,756 B2
(45) Date of Patent: Jan. 29, 2013

(54) WIRELESS RECEPTION DEVICE, WIRELESS COMMUNICATION SYSTEM AND WIRELESS COMMUNICATION METHOD

(75) Inventors: Ryota Yamada, Osaka (JP); Takashi Yoshimoto, Osaka (JP); Kazuyuki Shimezawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 398 days.

(21) Appl. No.: 12/602,033

(22) PCT Filed: May 22, 2008

(86) PCT No.: PCT/JP2008/059473
§ 371 (c)(1),
(2), (4) Date: Nov. 25, 2009

(87) PCT Pub. No.: WO2008/146713
PCT Pub. Date: Dec. 4, 2008

(65) Prior Publication Data
US 2010/0158080 A1    Jun. 24, 2010

(30) Foreign Application Priority Data
May 29, 2007    (JP) .................... 2007-141696

(51) Int. Cl.
*H04L 27/06* (2006.01)
(52) U.S. Cl. ..................... 375/340; 375/349
(58) Field of Classification Search .......... 375/224, 375/227, 260, 267, 285, 340, 346, 347, 349
See application file for complete search history.

(56) References Cited

U.S. PATENT DOCUMENTS

| | | | |
|---|---|---|---|
| 6,351,499 B1* | 2/2002 | Paulraj et al. | 375/267 |
| 7,010,070 B2 | 3/2006 | Li et al. | |
| 7,113,548 B2* | 9/2006 | Tanaka et al. | 375/267 |
| 7,466,969 B2* | 12/2008 | Kimata et al. | 455/272 |
| 7,499,728 B2* | 3/2009 | Chae et al. | 455/562.1 |

(Continued)

FOREIGN PATENT DOCUMENTS

| | | |
|---|---|---|
| CN | 1965518 A | 5/2007 |
| EP | 1 843 499 A1 | 10/2007 |

(Continued)

OTHER PUBLICATIONS

Gesbert, et al., "From Theory to Practice: An Overview of MIMO Space-Time Coded Wireless Systems", IEEE Journal on Selected Areas in Communications Apr. 2003, pp. 281-302, vol. 21, No. 3.

(Continued)

*Primary Examiner* — Jean B Corrielus
(74) *Attorney, Agent, or Firm* — Birch, Stewart, Kolasch & Birch, LLP

(57) ABSTRACT

A wireless reception device which communicates with a wireless transmission device which has a plurality of transmission antennas, includes at least one reception antenna which receives a plurality of transmission signals transmitted from the plurality of transmission antennas of the wireless transmission device; a channel response estimation unit which estimates a channel response between a plurality of transmission antennas and the reception antenna; a block dividing unit which divides a reception signal of at least one reception antennas into a plurality of blocks; and a transmission signal detection unit which detects the plurality of transmission signals transmitted by the wireless transmission device based on a plurality of reception signals divided by the block dividing unit and the channel response estimated by the channel response estimation unit.

16 Claims, 18 Drawing Sheets

U.S. PATENT DOCUMENTS

| | | | |
|---|---|---|---|
| 7,580,490 B2* | 8/2009 | Suh et al. | 375/349 |
| 2005/0249319 A1* | 11/2005 | Suh et al. | 375/347 |
| 2006/0013326 A1* | 1/2006 | Yoshida | 375/260 |
| 2006/0209975 A1* | 9/2006 | Jeong et al. | 375/260 |
| 2006/0222092 A1* | 10/2006 | Guo et al. | 375/260 |
| 2006/0222096 A1* | 10/2006 | Guo et al. | 375/260 |
| 2006/0245477 A1* | 11/2006 | Yoshida | 375/148 |
| 2007/0009023 A1* | 1/2007 | Kimata et al. | 375/229 |
| 2007/0263743 A1* | 11/2007 | Lee et al. | 375/267 |
| 2009/0270052 A1* | 10/2009 | Matsumoto et al. | 455/101 |
| 2010/0310025 A1* | 12/2010 | Morimoto et al. | 375/346 |

FOREIGN PATENT DOCUMENTS

| | | |
|---|---|---|
| JP | 2005-150839 A | 6/2005 |
| JP | 2005-170415 A | 6/2005 |
| JP | 2005-354222 A | 12/2005 |
| WO | WO-2006/075733 A1 | 7/2006 |
| WO | WO-2007/052651 A1 | 5/2007 |
| WO | WO-2008/146713 A1 | 12/2008 |

OTHER PUBLICATIONS

Yusuke Goto et al., "A study on single carrier eigen-mode transmission on MIMO frequency selective channels", Proceedings 1 of the 2006 IEICE Communications Society Conferences, Sep. 5, 2006, pp. 377.

* cited by examiner

WIRELESS RECEPTION DEVICE, WIRELESS COMMUNICATION SYSTEM AND WIRELESS COMMUNICATION METHOD

TECHNICAL FIELD

The present invention relates to a wireless reception device, a wireless communication system and a wireless communication method.

This application is a national phase of PCT/JP2008/059473 filed on May 22, 2008 and for which priority is claimed on Japanese Patent Application No. 2007-141696, filed May 29, 2007, the contents of which are incorporated herein by reference.

BACKGROUND ART

Recently, in the field of wireless communication, an MIMO (Multiple Input Multiple Output) is featured. The MIMO enables increase in the transmission rate without spreading the frequency band width by transmitting a signal from a wireless transmission device to a wireless reception device using same frequency and the same timing. In the MIMO system, the wireless reception device requires method of separating transmission signals which are spatial multiplexed, because the wireless reception device receives different multiplexed transmission signals.

FIG. 19 is an explanation diagram of a conventional MIMO system. A wireless transmission device 51 includes M (M is integral number which is 2 or greater than 2) number of transmission antennas. The wireless transmission device 51 transmits different transmission signals s1 to $s_M$ from each of the transmission antennas $A_{s1}$ to $A_{sM}$ to a wireless reception device 52. The transmission signals $s_1$ to $s_M$ which were transmitted from the each of the transmission antennas $A_{s1}$ to $A_{sM}$ of the wireless transmission device 51 are received by N (N is integral number which is 2 or greater than 2) number of reception antennas $A_{r1}$ to $A_{rN}$ of the wireless reception device 52. In this case, transmission and reception signals of the MIMO system are represented by formulas (1) to (5) which are shown below.

$$r = Hs + n \quad \text{(Formula 1)}$$

$$r = [r_1 \ldots r_N]^T \quad \text{(Formula 2)}$$

$$H = \begin{pmatrix} h_{11} & \cdots & h_{1M} \\ \vdots & \ddots & \vdots \\ h_{N1} & \cdots & h_{NM} \end{pmatrix} \quad \text{(Formula 3)}$$

$$s = [s_1 \ldots s_M]^T \quad \text{(Formula 4)}$$

$$n = [n_1 \ldots n_N]^T \quad \text{(Formula 5)}$$

The vector r of a left part of the formula (1) and a left part of the formula (2) are N-row by 1-column reception signal vectors which have elements of reception signals which are received by each of the reception antennas $A_{r1}$ to $A_{rN}$ of the wireless reception device 52. The vector H of a left part of the formula (3) is an N-row by M-column channel matrix which has elements of channel responses ($h_{11} \ldots h_{N1}, \ldots h_{1M} \ldots h_{NM}$) between each of the transmission antennas $A_{s1}$ to $A_{sM}$ of the wireless transmission device 51 and the reception antennas $A_{r1}$ to $A_{rN}$ of the wireless reception device 52. The $h_{11}$ is a channel response between the transmission antenna $A_{s1}$ and the reception antenna $A_{r1}$. $h_{N1}$ is a channel response between the transmission antenna $A_{s1}$ and the reception antenna $A_{rN}$. $h_{1M}$ is a channel response between the transmission antenna $A_{sM}$ and the reception antenna $A_{r1}$. $h_{NM}$ is a channel response between the transmission antenna $A_{sM}$ and the reception antenna $A_{rM}$. The symbol "T" in the top right of matrix indicates that the matrix is transposed matrix.

The vector s of a left part of the formula (4) is an M-row by 1-column vector which has elements of transmission signals which are transmitted by each of the transmission antennas $A_{s1}$ to $A_{sM}$ of the wireless transmission device 51. The vector n of a left part of the formula (5) is N-row by 1-column noise vector which has elements of noise which are added at each of the reception antennas $A_{r1}$ to $A_{rN}$ of the wireless reception device 52.

As a technique which departs spatial multiplexed signals like formula (1), linear processes (for example, the ZFD (the Zero Forcing Detection) and the MMSED (the Minimum Mean Square Error Detection) are known. These linear process are frequently used, because the number of calculation is fewer. The aforementioned MIMO system is disclosed in Non Patent Document 1.

Non Patent Document 1: D. Gesbert, M. Shafi, D. Shiu, P. J. Smith, A. Naguib, "From Theory to Practice: an overview of MIMO space-time coded wireless systems", IEEE JSAC, April, 2003

DISCLOSURE OF INVENTION

Problem to be Solved by the Invention

However, to obtain good channel characteristics using the ZFD or the MMSED, it is necessary for M to be equal to or less than N (M≦N) at the number M of the transmission antennas of the wireless transmission device 51 and the number N of the reception antennas of the wireless reception device 52. If M is greater than N (M>N), transmission characteristics considerably deteriorate. To avoid this problem, it is necessary to increase the number of reception antennas of the wireless reception device 52. However, if the wireless reception device 52 is a small wireless reception device (for example, the mobile terminal), it is difficult to increase the number of reception antennas, because the number of reception antennas which are located on the wireless reception device is limited.

The present invention is created in light of the aforementioned circumstances, and an object thereof is to provide a wireless reception device, a wireless communication system and a wireless communication method capable of obtaining good channel characteristics between the wireless transmission device and the wireless reception device without increasing the number of reception antennas of the wireless reception device.

Means for Solving the Problem (1) According to one aspect of the present invention, there is provided a wireless reception device which communicates with a wireless transmission device which has a plurality of transmission antennas, comprising: at least one reception antenna which receives a plurality of transmission signals transmitted from the plurality of transmission antennas of the wireless transmission device; a channel response estimation unit which estimates a channel response between a plurality of transmission antennas and the reception antenna; a block dividing unit which divides a reception signal of at least one reception antennas into a plurality of blocks; and a transmission signal detection unit which detects the plurality of transmission signals transmitted by the wireless transmission device based on a plurality of reception signals divided by the block dividing unit and the channel response estimated by the channel response estimation unit.

(2) Moreover, in the above described wireless reception device, the wireless reception device further comprising: a likelihood calculation unit which calculates a bit likelihood based on the reception signal being received by the reception antenna; a reception replica signal generation unit which generates a reception replica signal based on the channel response estimated by the channel response estimation unit and the bit likelihood calculated by the likelihood calculation unit; wherein the block dividing unit divides the reception signal of at least one reception antennas into a plurality of blocks, based on multi paths, using the reception replica signal generated by the reception replica generation unit.

(3) Moreover, in the above described wireless reception device, wherein the block dividing unit divides that the total number of blocks divided in the reception antenna is same or greater than the number of the plurality of transmission antennas.

(4) Moreover, in the above described wireless reception device, wherein the transmission signal detection unit converts the estimated channel responses into signals which correspond to the reception signals divided by the block dividing unit, and separates a plurality of converted channel responses by zero forcing criteria.

(5) Moreover, in the above described wireless reception device, wherein the transmission signal detection unit converts the estimated channel responses into signals which correspond to the reception signals divided by the block dividing unit, and separates a plurality of converted channel responses by MMSE criteria.

(6) Moreover, in the above described wireless reception device, wherein the transmission signal detection unit comprises: a fourier conversion unit which converts the reception signals into frequency region signals; a signal separation unit which calculates signals which were transmitted by a plurality of transmission antennas based on the frequency region signals into which the reception signals were converted by the fourier conversion unit; a demodulation unit which calculates bit likelihood based on the signal which was calculated by the signal separation unit; and a decoding unit which performs an error correction decoding process for the bit likelihood which was calculated by the demodulation unit.

(7) Moreover, in the above described wireless reception device, wherein the transmission signal detection unit comprises: a fourier conversion unit which converts the reception signals into frequency region signals; a signal separation unit which calculates signals which were transmitted by a plurality of transmission antennas based on the frequency region signals into which the reception signals were converted by the fourier conversion unit; an inverse fourier conversion unit which converts the signals which were calculated by the signal separation unit into time region signals; a demodulation unit which calculates bit likelihood based on the signal which was converted by the inverse fourier conversion unit; and a decoding unit which performs an error correction decoding process for the bit likelihood which was calculated by the demodulation unit.

(8) Moreover, in the above described wireless reception device, wherein the transmission signals are spread and code multiplexed, wherein the transmission signal detection unit comprises: a fourier conversion unit which converts the reception signals into frequency region signals; a signal separation unit which calculates signals which were transmitted by a plurality of transmission antennas based on the frequency region signals into which the reception signals were converted by the fourier conversion unit; an inverse spreading unit which performs inverse spreading for the signals which were calculated by the signal separation unit; a demodulation unit which calculates bit likelihood based on the signal which was calculated by the inverse spreading unit; and a decoding unit which performs an error correction decoding process for the bit likelihood which was calculated by the demodulation unit.

(9) Moreover, in the above described wireless reception device, wherein the transmission signal detection unit converts the estimated channel responses into signals which corresponds to the reception signals divided by the block dividing unit, and the signal separation unit which separates a plurality of multiplexed transmission signals based on the converted channel response and code multiplex number.

(10) Moreover, in the above described wireless reception device, wherein the signal separation unit separates a plurality of multiplexed transmission signals based on the converted channel and code multiplex number by zero forcing criteria.

(11) Moreover, in the above described wireless reception device, wherein the signal separation unit separates a plurality of multiplexed transmission signals based on the converted channel and code multiplex number by MMSE criteria.

(12) According to another aspect of the present invention, there is provided a wireless communication system which comprises a wireless transmission device and a wireless reception device; the wireless transmission device comprising a plurality of transmission antennas; and a transmission unit which transmits transmission signals using a plurality of transmission antennas, the wireless reception device comprising: at least one reception antenna which receives a plurality of transmission signals transmitted from the plurality of transmission antennas of the wireless transmission device; a channel response estimation unit which estimates a channel response between a plurality of transmission antennas and the reception antenna; a block dividing unit which divides a reception signal of at least one reception antennas into a plurality of blocks; and a transmission signal detection unit which detects the plurality of transmission signals transmitted by the wireless transmission device based on a plurality of reception signals divided by the block dividing unit and the channel response estimated by the channel response estimation unit.

(13) According to another aspect of the present invention, there is provided a wireless communication method which uses a wireless reception device, which has at least one reception antenna, which communicates with a wireless transmission device which has a plurality of transmission antennas, comprising: at least one reception antenna which receives a plurality of transmission signals transmitted from the plurality of transmission antennas of the wireless transmission device; a channel response estimation step which estimates a channel response between a plurality of transmission antennas and the reception antenna; a block dividing step which divides a reception signal of at least one reception antennas into a plurality of blocks; and a transmission signal detection step which detects the plurality of transmission signals transmitted by the wireless transmission device based on a plurality of reception signals divided at the block dividing step and the channel response estimated at the channel response estimation step.

(14) Moreover, in the above described wireless communication method, wherein the block dividing step and the transmission signal detection step are performed repeatedly.

Effect of the Invention

The present invention, in the MIMO, makes it possible to obtain good channel characteristics between the wireless transmission device and the wireless reception device without increasing the number of reception antennas of the wireless reception device.

Figure 1:
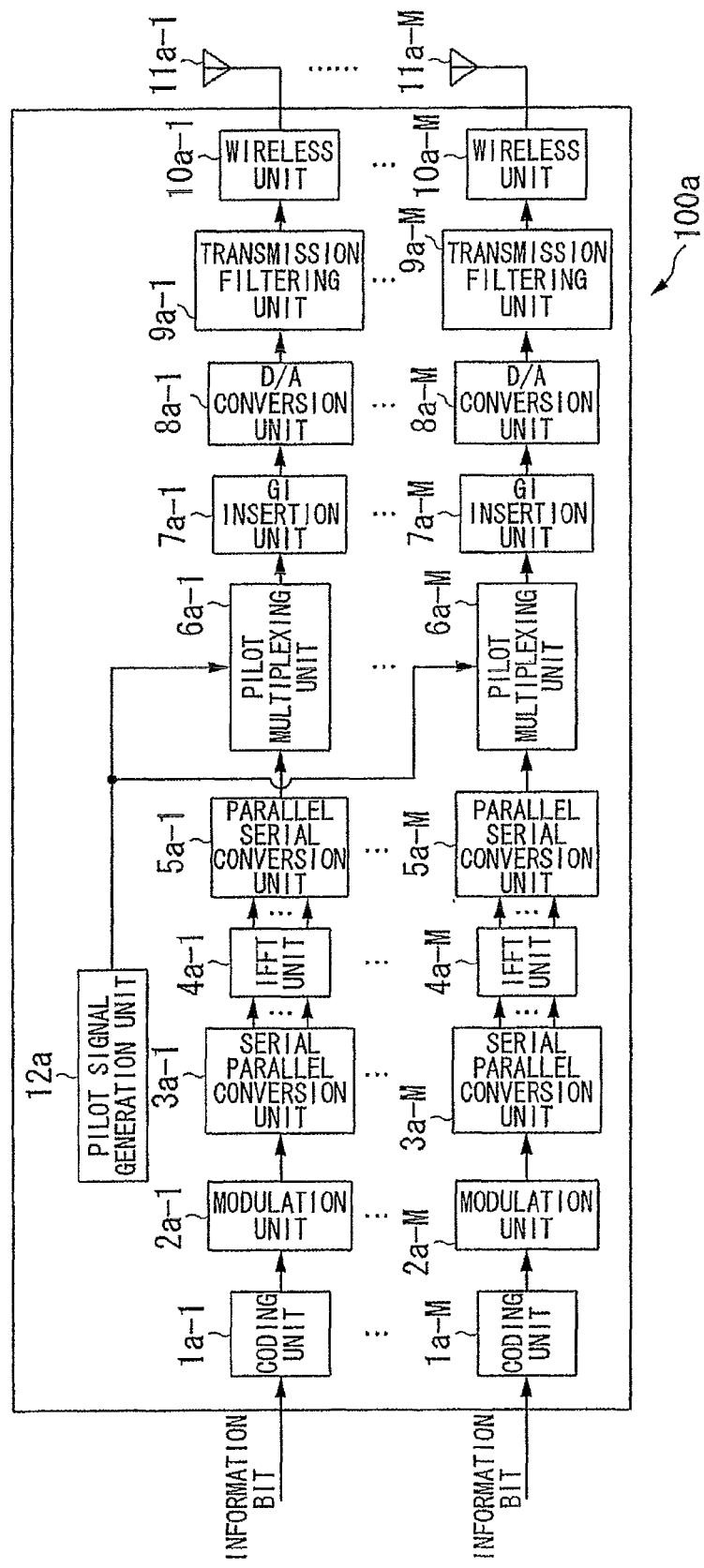
FIG. 1 is a schematic block diagram showing a structure of a wireless transmission device 100a according to a first embodiment of the present invention.

REFERENCE SYMBOLS 1a-1 to 1a-M coding unit
2a-1 to 2b-M modulation unit
3a-1 to 3a-M serial parallel conversion unit
4a-1 to 4c-M IFFT unit
5a-1 to 5c-M parallel serial conversion unit
6a-1 to 6c-M pilot multiplexing unit
7a-1 to 7c-M GI insertion unit
8a-1 to 8c-M digital analog conversion unit
9a-1 to 9c-M transmission filtering unit
10a-1 to 10c-M wireless unit
11a-1 to 11c-M transmission antenna
12a, 12b pilot signal generation unit
13a-1 to 13d-N reception antenna
14a-1 to 14d-N wireless unit
15a-1 to 15d-N reception filtering unit
16a-1 to 16d-N analog digital conversion unit
21a-1-1 to 21d-N-$N_{NR}$ block dividing unit
22a, 22d signal detection unit
23a, 23d replica generation unit
24a to 24d channel estimation unit
32c-1-1 to 32c-M-Cn code channel signal generation unit
34c-1 to 34c-M code multiplexing unit
100a to 100c wireless transmission device
122b signal detection unit
123b replica generation unit
200a to 200d wireless reception device
222c signal detection unit
223c replica generation unit
241c-1 to 241c-M pilot signal generation unit

BEST MODE FOR CARRYING OUT THE INVENTION

First Embodiment

The first embodiment of the present invention is described below. In the first embodiment, the present invention applies to MIMO-OFDM (Orthogonal Frequency Division Multiplexing).

FIG. 1 is a schematic block diagram showing a structure of a wireless transmission device 100a according to a first embodiment of the present invention. The wireless transmission device 100a includes coding units 1a-1 to 1a-M, modulation units 2a-1 to 2a-M, serial parallel conversion units 3a-1 to 3a-M, IFFT (Inverse Fast Fourier Transform) units 4a-1 to 4a-M (inverse fourier conversion unit), parallel serial conversion units 5a-1 to 5a-M, pilot multiplexing units 6a-1 to 6a-M, GI (Guard Interval) insertion units 7a-1 to 7a-M, D/A (Digital to Analogue) conversion units 8a-1 to 8a-M, transmission filtering units 9a-1 to 9a-M, wireless units 10a-1 to 10a-M, transmission antennas 11a-1 to 11a-M, and a pilot signal generation unit 12a.

In the transmission device 100a, the coding unit 1a-1 performs an error correction coding (for example, the convolution coding or the turbo coding) for an information bit which is outputted from an upper layer of the wireless transmission device 100a. The coding bit performed error correction coding by the coding unit 1a-1 are mapped to a modulation symbol (for example, the QPSK (the Quadrature Phase Shift Keying) or the 16 QAM (the 16 Quadrature Amplitude Modulation)) by the modulation unit 2a-1. The modulation symbols, which are outputted from the modulation unit 2a-1, are performed the serial parallel conversion by the serial-parallel conversion unit 3a-1, and are performed the time-frequency conversion by the IFFT unit 4a-1, and are performed the parallel-serial conversion by the parallel serial conversion unit 5a-1.

The signals, which are outputted from the parallel serial conversion unit 5a-1, are multiplexed pilot signals generated in the pilot signal generation unit 12a by the pilot multiplexing unit 6a-1, and are inserted guard interval by the GI insertion unit 7a-1, and are performed the D/A conversion by the D/A conversion unit 8a-1.

The analog signals, which are performed the D/A conversion by the D/A conversion unit 8a-1, are performed waveform reshaping by the transmission filtering unit 9a-1, and are converted to wireless frequency by the wireless unit 10a-1. The transmission antenna 11a-1 transmits the signals, which were converted to wireless frequency by the wireless unit 10a-1, to the wireless reception device 200a (FIG. 2).

Multiple transmission signals (M of transmission signals) are generated in parallel based on the aforementioned processes, and transmitted to the wireless reception device 200a with the same frequency and the same timing via the plurality of transmission antennas 11a-1 to 11a-M. The transmission signals are transmitted to the wireless reception device 200a via a multi-path channel.

In addition, the configuration of the coding units 1a-2 (not shown) to 1a-M, the modulation units 2a-2 (not shown) to 2a-M, the serial parallel conversion units 3a-2 (not shown) to 3a-M, the IFFT units 4a-2 (not shown) to 4a-M, the parallel serial conversion units 5a-2 (not shown) to 5a-M, the pilot multiplexing units 6a-2 (not shown) to 6a-M, the GI insertion units 7a-2 (not shown) to 7a-M, the D/A conversion units 8a-2 (not shown) to 8a-M, the transmission filtering units 9a-2 (not shown) to 9a-M, the wireless units 10a-2 (not shown) to 10a-M and the transmission antennas 11a-2 (not shown) to 11a-M are same as the configuration of the coding unit 1a-1, the modulation unit 2a-1, the serial parallel conversion unit 3a-1, the IFFT unit 4a-1, the parallel serial conversion unit 5a-1, the pilot multiplexing unit 6a-1, the GI insertion unit 7a-1, the D/A conversion unit 8a-1, the transmission filtering unit 9a-1, the wireless unit 10a-1 and the transmission antenna 11a-1, respectively. Therefore, the explanations thereof are omitted.

Figure 2:
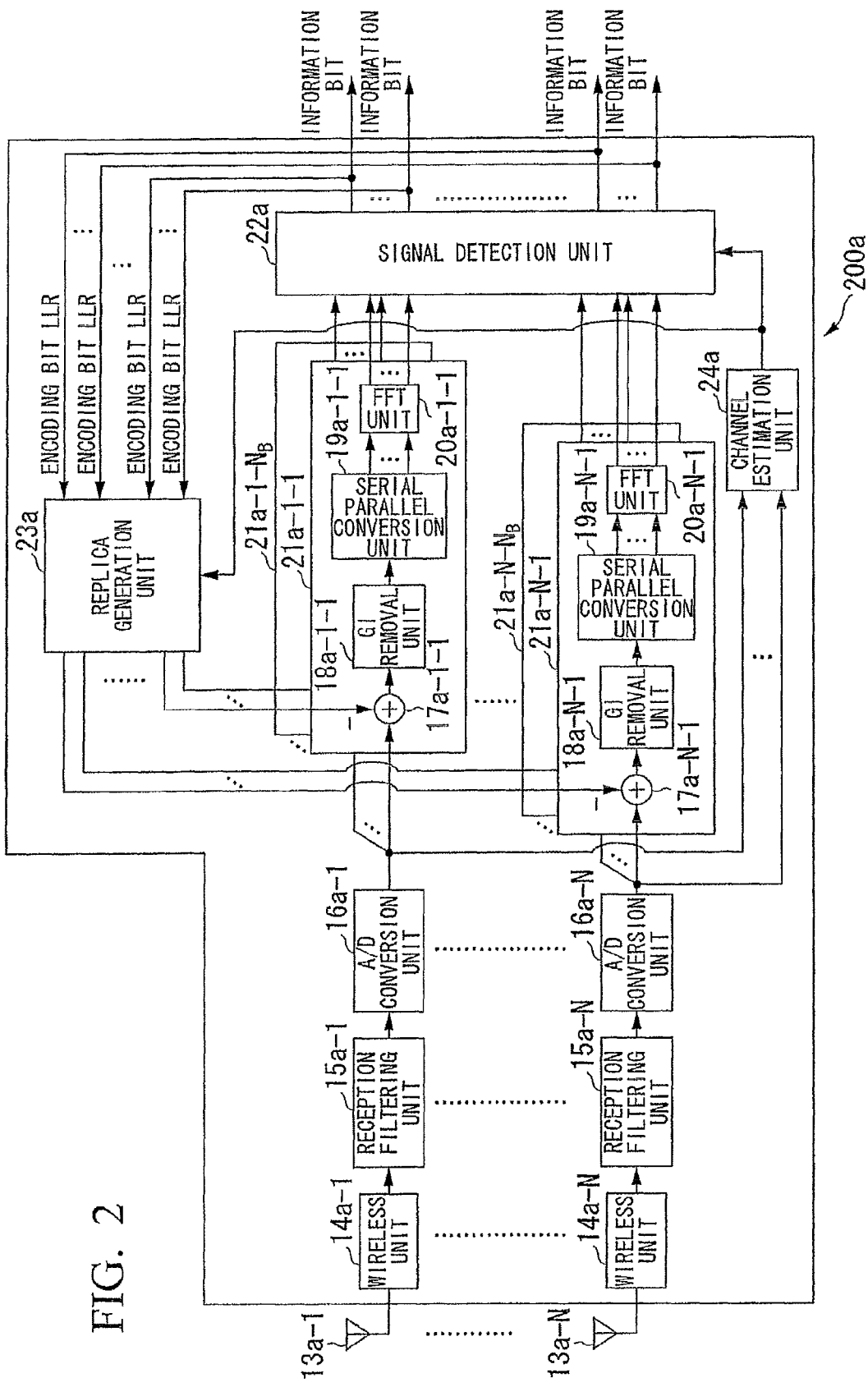
FIG. 2 is a schematic block diagram showing a structure of a wireless reception device 200a according to the first embodiment of the present invention.

FIG. 2 is a schematic block diagram showing a structure of a wireless reception device 200a according to the first embodiment of the present invention. The wireless reception device 200a includes reception antennas 13a-1 to 13a-N, wireless units 14a-1 to 14a-N, reception filtering units 15a-1 to 15a-N, A/D conversion units 16a-1 to 16a-N, block dividing units 21a-1-1 to 21a-1-$N_B$ ($N_B$ is integral number which is equal to 2 or larger than 2), . . . , 21a-N-1 to 21a-N-$N_B$, a signal detection unit 22a (likelihood calculation unit, transmission signal detection unit), a replica generation unit 23a (reception replica signal generation unit) and a channel estimation unit 24a (channel response estimation unit).

The block dividing unit 21a-1-1 includes an adding unit 17a-1-1, a GI removing unit 18a-1-1, a serial parallel conversion unit 19a-1-1 and an FFT unit 20a-1-1 (fourier conversion unit). The block dividing unit 21a-1-1 divides the reception signals being received by the reception antennas 13a-1 to 13a-N into a plurality of blocks, using reception replica signal generated by the replica signal generation unit 23a. The block dividing unit 21a-1-1 may divide into a plurality of blocks as the number of reception signals being received by the reception antennas 13a-1 to 13a-N are greater than the number of transmission antennas 11a-1 to 11a-M of the wireless reception device 100a.

In addition, the configuration of the block dividing units 21a-1-2 to 21a-1-$N_B$ and the block dividing units 21a-N-1 to 21a-N-$N_B$ are same as the configuration of the block dividing unit 21-1-1 (not shown). Therefore, the explanations thereof are omitted.

In the wireless reception device 200a, the wireless unit 14a-1 converts the signal, which is received by the reception antenna 13a-1, from a wireless frequency to a base band signal. The received base band signal, which is outputted from the wireless unit 14a-1, are performed the waveform shaping by the reception filtering unit 15a-1, and are converted from an analog signal to a digital signal by the A/D conversion unit 16a-1.

The block dividing units 21a-1-1 to 21a-1-$N_B$ divide the signal, which was converted to a digital signal by the A/D conversion unit 16a-1, based on the arrival time, the electric power or the number of times the delay wave paths (the delay wave includes the first arriving wave from the wireless transmission device 100a to the wireless reception device 200a).

In the block dividing unit 21a-1-1, the signal, which were performed A/D conversion by the A/D conversion unit 16a-1, are removed replica of delay element generated by the replica generation unit 23a by the adding unit 17a-1-1, and are removed guard interval by the GI removal unit 18a-1-1, and are performed the serial parallel conversion by the serial parallel conversion unit 19a-1-1, and performed time-frequency conversion by the FFT unit 20a-1-1, and outputted to the signal detection unit 22a as frequency signal.

The signal detection unit 22a calculates the likelihood of the reception signals being received by the reception antennas 13a-1 to 13a-N, and outputs it to the replica generation unit 23a. In addition, the signal detection unit 22a detects the transmission signal which was transmitted by the wireless transmission device 100a based on the reception signals which were divided into a plurality of blocks by the block dividing units 21a-1-1 to 21-1-$N_B$, . . . , 21a-N-1 to 21a-N-$N_B$ and the channel response which was estimated by the channel estimation unit 24a. The channel estimation unit 24a estimates a channel response using pilot signal using an RLS (Recursive Least Square) algorithm.

The replica generation unit 23a generates a reception replica signal based on the channel response which was estimated by the channel estimation unit 24a and on the likelihood which was calculated by the signal detection unit 22a, and outputs it to the block dividing units 21a-1-1 to 21-1-$N_B$.

The channel estimation unit 24a estimates a channel response between a plurality of transmission antennas 11a-1 to 11a-M of the wireless transmission device and the reception antennas 13a-1 to 13a-N of the wireless reception device 200a, and outputs the channel response to the signal detection unit 22a and the replica generation unit 23a.

FIGS. 3(a) to 3(d) are explanation diagrams of a replica subtract process which is performed in a block dividing unit of the wireless reception device 200a according to the first embodiment of the present invention. FIGS. 3(a) to 3(d) indicate delay profiles. In FIGS. 3(a) to 3(d), the horizontal axis indicates time, and the longitudinal axis indicates electric power.

The p1, p2, p3, p4, p5 and p6 are one example each of a channel response of each path of the multi-path channel. The delay wave is divided into block b1 (FIG. 3(b)), block b2

Figure 3:
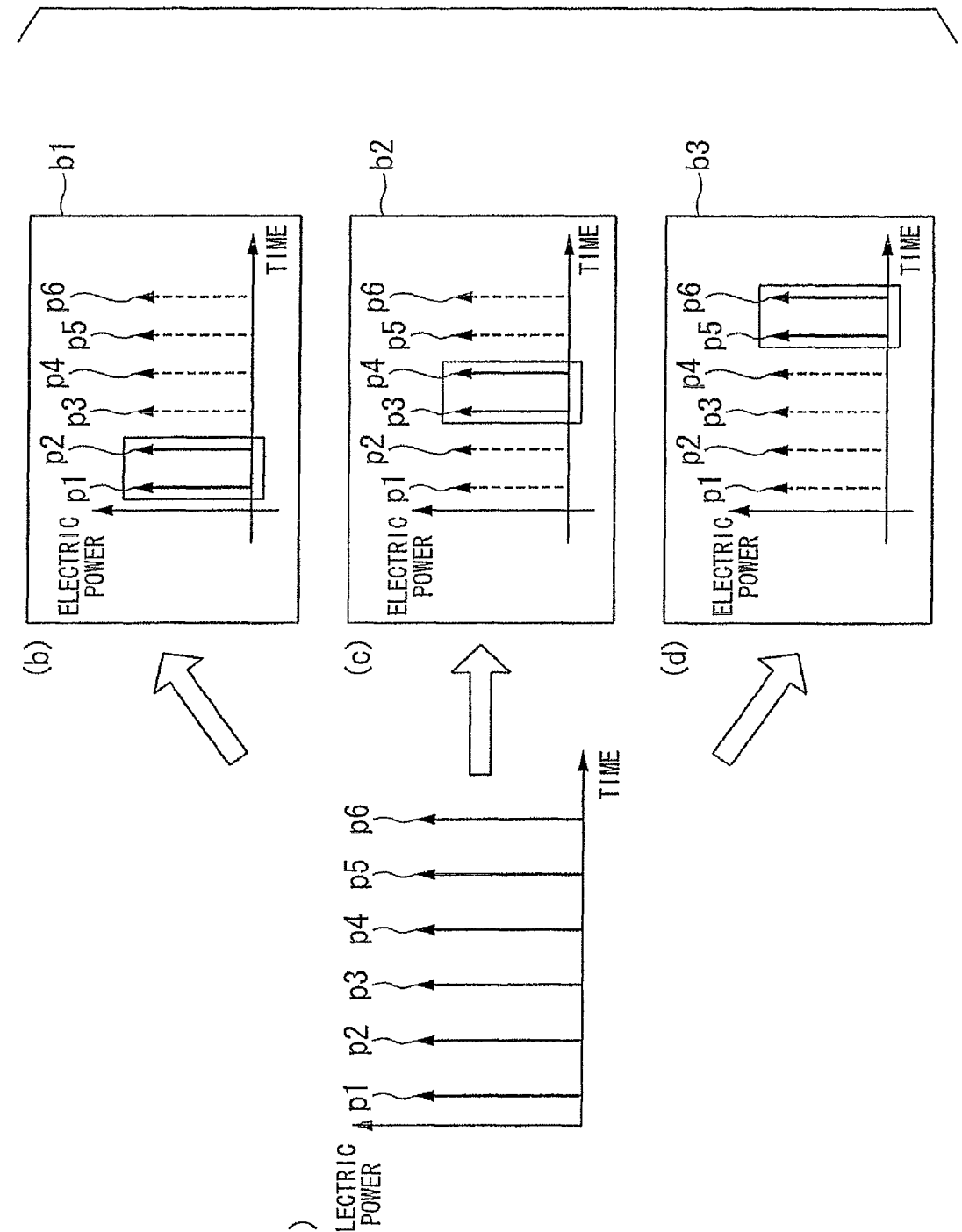
FIG. 3 is an explanation diagram of a replica subtract process which is performed in a block dividing unit of the wireless reception device 200a according to the first embodiment of the present invention.

(FIG. 3(c)) and block b3 (FIG. 3 (d)). The paths p1 to p6 are divided into three paths each in an equal intervals along the time axis with each path including two paths.

When paths p1 to p6 are divided, the replica generation unit 23a generates paths p3, p4, p5 and p6 when the block b1 is generated, generates paths p1, p2, p5 and p6 when the block b2 is generated, and generates paths p1, p2, p3 and p4 when the block b3 is generated. Then, each of the reception signal is subtracted the path which was generated by the replica generation unit 23a.

By dividing the multi-path p1 to p6 into blocks b1 to b3, the output signal of each block dividing unit 21a is independent signal, and the reception signals virtually increase.

Figure 4:
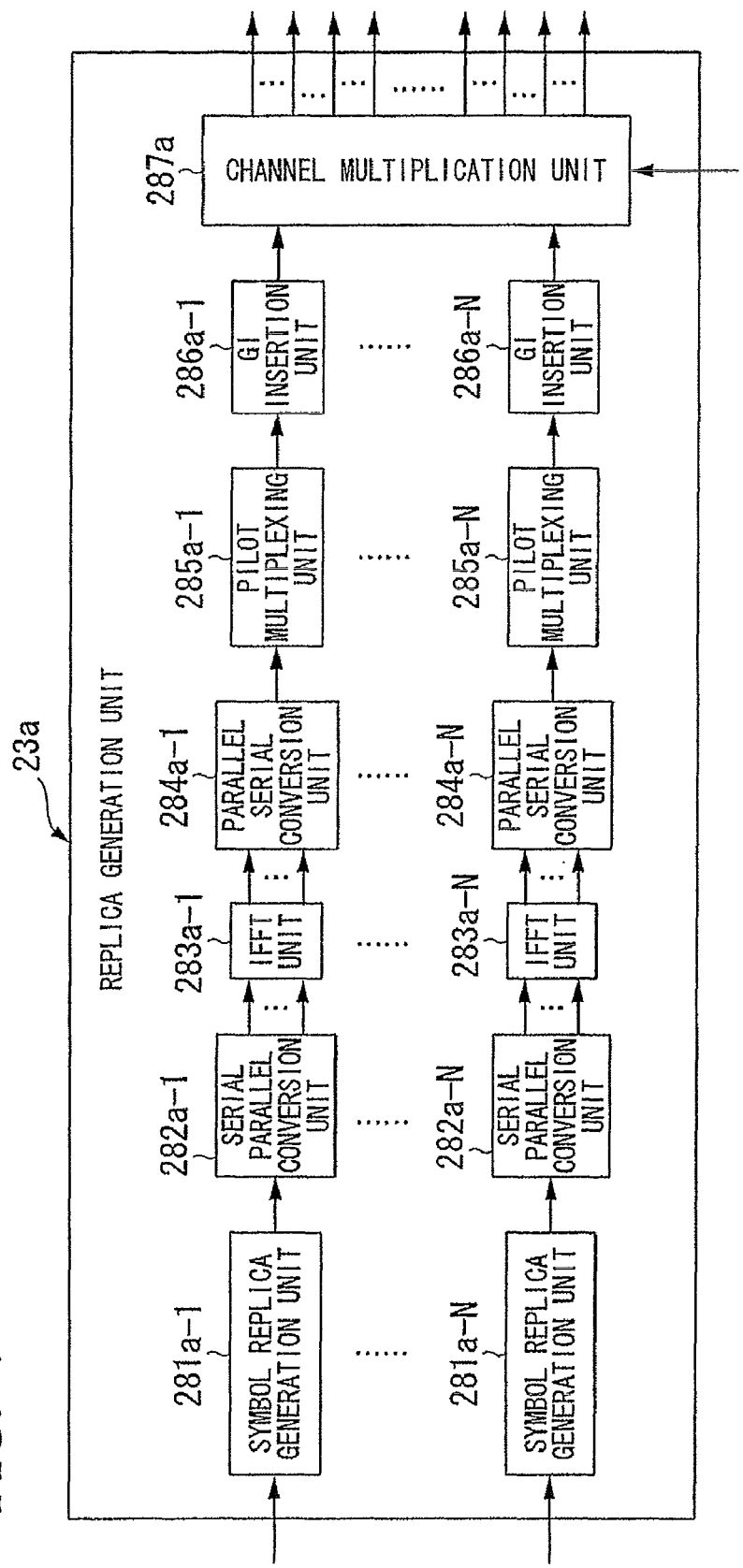
FIG. 4 is a schematic block diagram showing a structure of a replica generation unit 23a of the wireless reception device (FIG. 2) according to the first embodiment of the present invention.

FIG. 4 is a schematic block diagram showing a structure of a replica generation unit 23a of the wireless reception device (FIG. 2) according to the first embodiment of the present invention. The replica generation unit 23a includes symbol replica generation units 281a-1 to 281a-N, serial parallel conversion units 282a-1 to 282a-N, IFFT units 283a-1 to 283a-N, parallel serial conversion units 284a-1 to 284a-N, pilot multiplexing units 285a-1 to 285a-N, GI insertion units 286a-1 to 286a-N and a channel multiplication unit 287a.

The symbol replica generation unit 281a-1 converts the bit LLR (Log Likelihood Ratio) outputted from the signal detection unit 22a (FIG. 2) to modulation symbol replica, and outputs it to adding units of the block dividing units 21a-1-1 to 21a-1-NB, . . . , 21a-N-1 to 21a-N-NB. In the first embodiment, QPSK modulation is used as a method of generating symbol replica based on the bit LLR.

If the log likelihood ratio which is included in QPSK modulation represents $\lambda(b_0)$ and $\lambda(b_1)$, replica Z of the modulation symbol of QPSK is able to represent by formula (6) described below.

$$Z = \frac{1}{\sqrt{2}}\tanh(\lambda(b_0)/2) + \frac{j}{\sqrt{2}}\tanh(\lambda(b_1)/2) \quad \text{(Formula 6)}$$

In the formula (6), j is an imaginary number unit. The output signal of the symbol replica generation unit 281a-1 are performed the serial parallel conversion by the serial parallel conversion unit 282a-1, and are performed the frequency-time conversion by the IFFT unit 283a-1, and are performed the parallel serial conversion by the parallel serial conversion unit 284a-1, and multiplexed the pilot signal by the pilot multiplexing unit 285a-1, and are inserted the guard interval by the GI insertion unit 286a-1. These processes are performed in parallel at the serial parallel conversion units 282a-1 to 282a-N, the IFFT units 283a-1 to 283a-N, the parallel serial parallel conversion units 284a-1 to 284a-N, the pilot multiplexing units 285a-1 to 285a-N and the GI insertion units 286a-1 to 286a-N.

In the channel multiplication unit 287a, for the output signals of the GI insertion units 286a-1 to 286a-N, by convoluting the channel response estimated by the channel estimation unit 24a (FIG. 2) into the channel which was divided into blocks, the replica signals for block dividing are generated. The replica generation unit 23a outputs the replica signal for block dividing to each adding units of the block dividing units 21a-1-1 to 21a-1-$N_B$, . . . , 21a-N-1 to 21a-N-$N_B$.

The channel response which was estimated by the channel estimation unit 24a is "h", and the output signal of the GI insertion units 286a-1 to 286a-N is "s", and the process of dividing into three blocks (b1, b2 and b3) in the channel multiplication unit 287a is described below. The number of transmission antennas is two, and the number of reception antennas is two. The replica signal for abstracting block b1 is vector $r^1$, and the channel response of delay wave element is vector $h^1$. In this case, vector $h^1$ is able to represent by formula (7) because a 2-row by 2-column MIMO system is used.

$$h^1 = \begin{pmatrix} h^1_{11} & h^1_{12} \\ h^1_{21} & h^1_{22} \end{pmatrix} \quad \text{(Formula 7)}$$

Each element of the vector $h^1$ is channel response between each of the transmission antenna and each of the reception antenna. The vector $r^1$ which is a replica signal for abstracting the block b1 from the output signals of the channel multiplication unit 287a is represented by formula (8) described below.

$$r^1 = \begin{pmatrix} r^1_1 \\ r^1_2 \end{pmatrix} = \begin{pmatrix} h^1_{11} \otimes s_1 + h^1_{12} \otimes s_2 \\ h^1_{21} \otimes s_1 + h^1_{22} \otimes s_2 \end{pmatrix} \quad \text{(Formula 8)}$$

$\otimes$ indicates a convolution calculation.

The $r^1_1$ in the formula (8) represents the element of the first reception antenna. The $r^1_2$ in the formula (8) represents the element of the second reception antenna. The $s_1$ represents the element of the signal which is transmitted by the first transmission antenna. The $s_2$ represents the element of the signal which is transmitted by the second transmission antenna. In case of blocks b2 and b3 similarly, if the replica signal for abstracting the block b2 is vector $r^2$, the channel response of delay wave element is $h^2$, and if the replica signal for abstracting the block b3 is vector $r^3$, the channel response of delay wave element is $h^3$. The output signal of the channel multiplication unit 287a represents formula (9) and formula (10) described below.

$$r^2 = \begin{pmatrix} r^2_1 \\ r^2_2 \end{pmatrix} = \begin{pmatrix} h^2_{11} \otimes s_1 + h^2_{12} \otimes s_2 \\ h^2_{21} \otimes s_1 + h^2_{22} \otimes s_2 \end{pmatrix} \quad \text{(Formula 9)}$$

$$r^3 = \begin{pmatrix} r^3_1 \\ r^3_2 \end{pmatrix} = \begin{pmatrix} h^3_{11} \otimes s_1 + h^3_{12} \otimes s_2 \\ h^3_{21} \otimes s_1 + h^3_{22} \otimes s_2 \end{pmatrix} \quad \text{(Formula 10)}$$

The $r^1$, $r^2$ and $r^3$ outputted by the replica generation unit 23a are inputted to the block dividing units 21a-1-1 to 21a-1-$N_B$, . . . , 21a-N-1 to 21a-N-$N_B$. The adding units 17a-1-1 to 17a-1-$N_B$, . . . , 17a-N-1 to 17a-N-$N_B$ subtract the $r^1$, $r^2$ and $r^3$ from the reception signal. Therefore, the block dividing is performed. For example, if $r^1$ is subtracted from the reception signal, the block b1 is abstracted.

Figure 5:
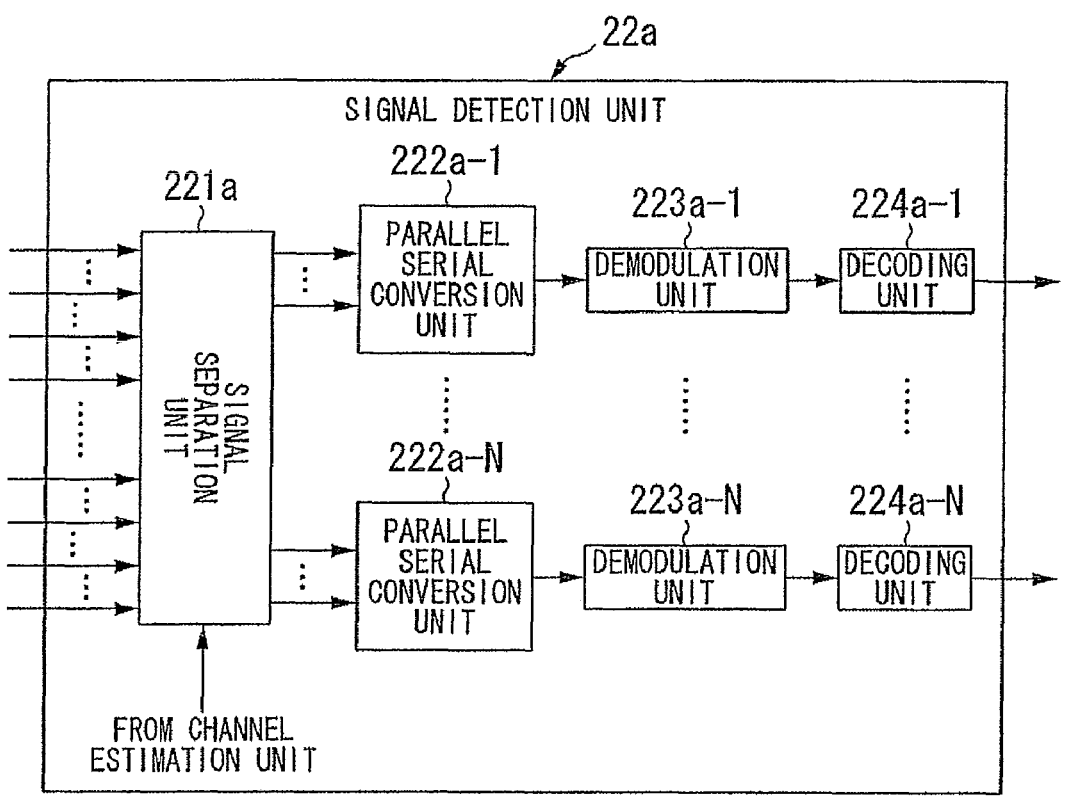
FIG. 5 is a schematic block diagram showing a structure of a signal detection unit 22a (FIG. 2) of the wireless reception device 200a according to the first embodiment of the present invention.

FIG. 5 is a schematic block diagram showing a structure of a signal detection unit 22a (FIG. 2) of the wireless reception device 200a according to the first embodiment of the present invention. The signal detection unit 22a includes a signal separation unit 221a, parallel serial conversion units 222a-1 to 222a-N, the demodulation units 223a-1 to 223a-N and decoding units 224a-1 to 224a-N.

The signal separation unit 221a estimates the signal transmitted by each of the transmission antennas 11a-1 to 11a-M of the wireless transmission device 100a, based on the signals outputted from the block dividing units 21a-1-1 to 21a-1-$N_B$, . . . , 21a-N-1 to 21a-N-$N_B$, The process of the signal separation unit 221 is described below. The number of transmission antennas is $N_T$, and the number of reception antennas is $N_R$. The number of block dividing may be different for each of the reception antenna. Each of the reception antenna uses same number of block dividing.

Before the block dividing is performed, the MIMO system uses a $N_T$-row by $N_R$-column matrix. However, the number of reception signals is virtually increased by block dividing. After the block dividing, the MIMO uses an $N_T$-row by $(N_R N_B)$-column matrix. The signal separation unit 221a estimates $N_T$ transmission signals based on $N_R N_B$ reception signals for each subcarrier. The reception signal of k-th sub carrier represents formulas (11) to (15) described below.

$$R(k)=H(k)S(k)+N(k) \qquad \text{(Formula 11)}$$

$$R(k)=[R_1(k) \ldots R_{N_R N_B}(k)]^T \qquad \text{(Formula 12)}$$

$$H(k) = \begin{pmatrix} H_{11}(k) & \ldots & H_{1N_T}(k) \\ \vdots & \ddots & \vdots \\ H_{(N_R N_B)1}(k) & \ldots & H_{(N_R N_B)N_T}(k) \end{pmatrix} \qquad \text{(Formula 13)}$$

$$S(k)=[S_1(k) \ldots S_{N_T}(k)]^T \qquad \text{(Formula 14)}$$

$$N(k)=[N_1(k) \ldots N_{N_R N_B}(k)]^T \qquad \text{(Formula 15)}$$

The vector R(k) of a left part of the formula (11) and a left part of the formula (12) are $N_R N_B$-row by 1-column vector which has the output of the block dividing unit of the wireless reception device 200a. The vector H(k) of the a left part of the formula (13) is $(N_R N_B)$-row by $N_T$-column matrix which has frequency response of paths abstracted by each block. The vector S(k) of the a left part of the formula (14) is $N_T$-row by 1-column vector which has element of modulation symbol of transmission side. The vector N(k) of the left side of the formula (15) is $(N_R N_B)$-row by 1-column vector which has element of noise of each block dividing units 21a-1-1 to 21a-1-$N_B$, ..., 21a-N-1 to 21a-N-$N_B$.

The vector H(k) is described below, using the $h^1$, $h^2$ and $h^3$. The channel responses abstracted delay wave element except delay wave including $h^1$, $h^2$ and $h^3$ from h are $h^{-1}$, $h^{-2}$ and $h^{-3}$. It is able to consider that the $h^{-1}$, $h^{-2}$ and $h^{-3}$ are channel responses after block dividing. If the signals which are converted into frequency region are $h^{-1}$, $h^{-2}$ and $h^{-3}$ are the vector $H^1(k)$, vector $H^2(k)$ and vector $H^3(k)$, $H^1(k)$, vector $H^2(k)$ and vector $H^3(k)$ are able to represent formula (16), formula (17) and formula (18) described below.

$$H^1(k) = \begin{pmatrix} H^1_{11}(k) & H^1_{12}(k) \\ H^1_{21}(k) & H^1_{22}(k) \end{pmatrix} \qquad \text{(Formula 16)}$$

$$H^2(k) = \begin{pmatrix} H^2_{11}(k) & H^2_{12}(k) \\ H^2_{21}(k) & H^2_{22}(k) \end{pmatrix} \qquad \text{(Formula 17)}$$

$$H^3(k) = \begin{pmatrix} H^3_{11}(k) & H^3_{12}(k) \\ H^3_{21}(k) & H^3_{22}(k) \end{pmatrix} \qquad \text{(Formula 18)}$$

In this case, the vector H(k) is able to represent formula (19) described below.

$$H(k) = \begin{pmatrix} H^1_{11}(k) & H^1_{12}(k) \\ H^1_{21}(k) & H^1_{22}(k) \\ H^2_{11}(k) & H^2_{12}(k) \\ H^2_{21}(k) & H^2_{22}(k) \\ H^3_{11}(k) & H^3_{12}(k) \\ H^3_{21}(k) & H^3_{22}(k) \end{pmatrix} \qquad \text{(Formula 19)}$$

Originally, the MIMO system uses 2-row by 2-column matrix. However, by dividing into three blocks at each of the reception antennas, the MIMO system is able to use 2-row by 6-column matrix.

To detect vector S(k) from vector R(k), weighting factor of ZF (Zero-Forcing) criteria or MMSE (Minimum Mean Square Error) criteria is used.

For example, the weighting vector $M_{ZF}(k)$ of ZF criteria represents formula (20-1) or formula (20-2) described below.

For example, the weighting vector $M_{MMSE}(k)$ of MMSE criteria represents formula (21-1) or formula (21-2).

$$M_{ZF}(k)=H^H(k)(H(k)H^H(k))^{-1} \qquad \text{(Formula 20-1)}$$

$$M_{ZF}(k)=(H^H(k)H(k))^{-1}H^H(k) \qquad \text{(Formula 20-2)}$$

$$M_{MMSE}(k)=H^H(k)(H(k)H^H(k)+\sigma^2 I_{N_R})^{-1} \qquad \text{(Formula 21-1)}$$

$$M_{MMSE}(k)=(H^H(k)H(k)+\sigma^2 I_{N_T})^{-1}H^H(k) \qquad \text{(Formula 21-2)}$$

In the formula (20-1), the formula (20-2), the formula (21-1) and the formula (21-2), H represents a complex Hermitian matrix, $^{-1}$ represents an inverse matrix, $\sigma^2$ represents electric power noise, vector $I_N$ represents N-row by N-column unit matrix. To detect the vector S(k), $M_{ZF}(k)$ or $M_{MMSE}(k)$ is multiplied from left side of vector R(k). The linear process (for example, the ZF criteria, the MMSE criteria) is used. However, a non-linear process (for example, the ML (the Maximum Likelihood)) may be used.

However, the accuracy of output of the replica generation unit 23a is not perfect. Therefore, considering the error which occurs in block dividing, noise and error may be used at $\sigma^2$ of the formula (21-1) and the formula (21-2). In addition, error in the vector H(k) may be considered in the formula (20-1), the formula (20-2), the formula (21-1) and the formula (21-2). The channel response $h^{-1}$ of the block b1 after block dividing is h which does not include a delay wave element. However, $h^{-1}$ may include the $h^1$ according to the accuracy of modulation symbol replica which is generated based on coding bit LLR or bit LLR.

In this case, if the absolute value of the bit LLR is large, it is likely that a perfect replica is generated. Therefore, there is no error in block dividing, and $h^{-1}$ does not include an $h^1$ element. However, as the absolute value of the bit LLR decreases, the error in block dividing increases, and $h^1$ which is included in the $h^{-1}$ increase. If bit LLR is zero, $h^{-1}$ entirely includes h1. This is similar in blocks b2 and b3. Therefore, in vector H(k), the error in block dividing is reflected. Therefore, if weighting value $M_{ZF}(k)$ or $M_{MMSE}(k)$ is calculated using the formula (20-1), the formula (20-2), the formula (21-1) and the formula (21-2) based on the vector H(k) which reflects the error, it is possible to calculate a weighting value which reflects the error in block dividing.

The output signal of the signal separation unit 221a is performed parallel serial conversion by the parallel serial conversion unit 222-1a, and is converted to bit LLR by the demodulation unit 223a-1. The method of calculating the coding bit LLR based on the symbol at the wireless reception device 200a side is described in case of QPSK modulation. A QPSK symbol transmitted by the wireless transmission device 100a is X. The symbol after inverse diffusion at the wireless reception device 200a is $X_c$. If the bits which comprise X are $b_0$ and $b_1$ ($b_0$, $b_1 = \pm 1$), X is able to represent the formula (22) described below.

$$X = \frac{1}{\sqrt{2}}(b_0 + jb_1) \quad \text{(Formula 22)}$$

$\lambda(b_0)$ and $\lambda(b_1)$ which are LLR of $b_0$ and $b_1$ are calculated based on the $X_c$ which is an estimated value of X at the wireless reception device 200a, using the formula (23) described below.

$$\lambda(b_0) = \frac{2\text{Re}(X_c)}{\sqrt{2}(1-\mu)} \quad \text{(Formula 23)}$$

Re( ) in the formula (23) represents the real part of complex number. μ is the equivalent amplitude after channel compensation. In the formula (21-1) and the formula (21-2), μ is corresponding antenna element from the element $M_{MMSE}H$(k). The $\lambda(b_1)$ is a value which replaces the real part and the imaginary part of $\lambda(b_0)$.

The coding bit LLR which is an output signal of the demodulation unit is inputted to the decoding unit 224a-1. The decoding unit 224a-1 outputs a coding bit LLR or information bit which is the updated likelihood by decoding process.

In addition, constitutions of the parallel serial conversion units 222a-2 (not shown) to 222a-N, the demodulation units 223a-2 (not shown) to 222a-N and the decoding units 224a-2 (not shown) to 224a-N are same as the parallel serial conversion units 222a-1, the demodulation units 223a-1 and the decoding units 224a-1. Therefore, the explanations thereof are omitted.

Figure 6:
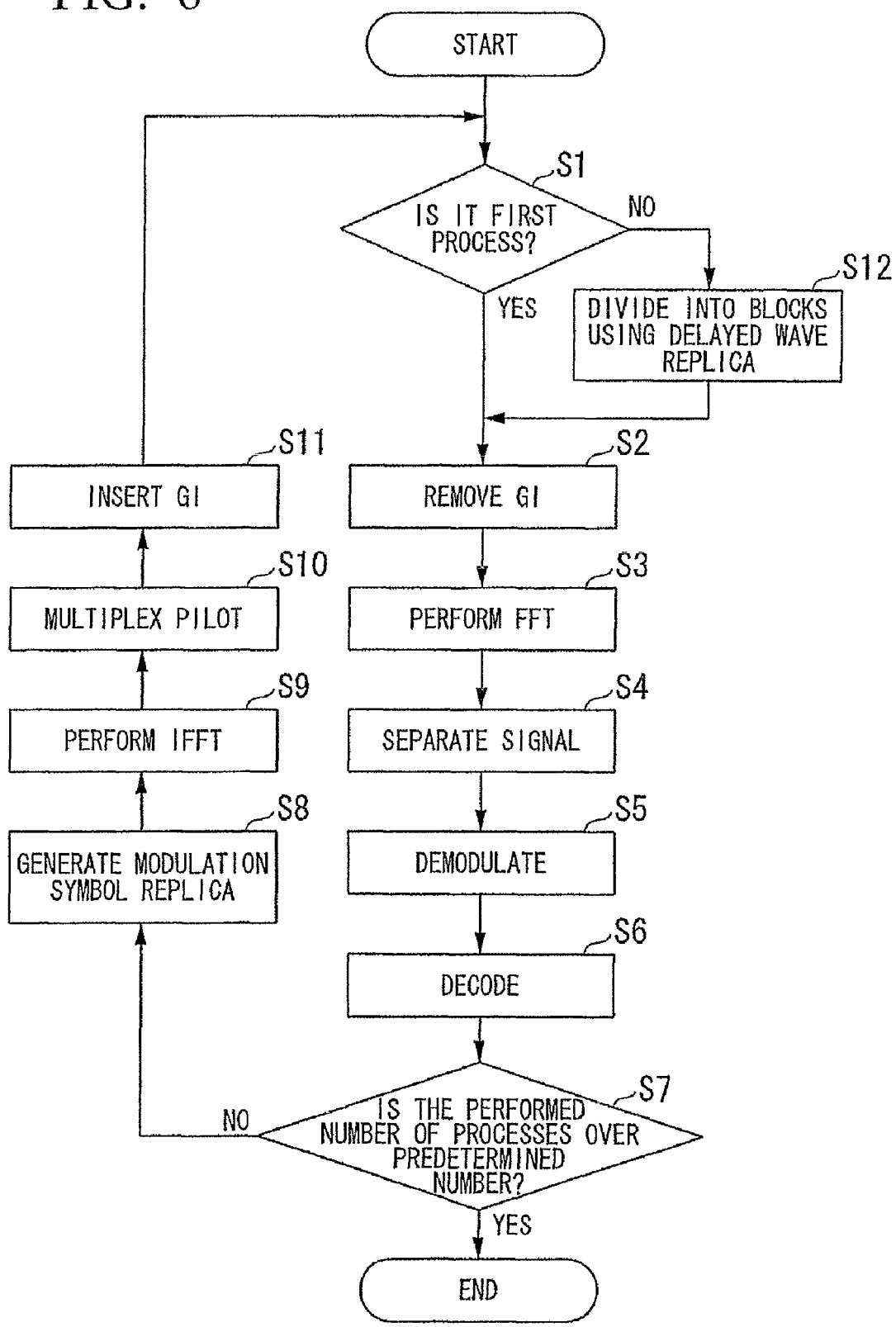
FIG. 6 is a flowchart showing the processes of the wireless reception device 200a according to the first embodiment of the present invention.

FIG. 6 is a flowchart showing the processes of the wireless reception device 200a according to the first embodiment of the present invention. First, the wireless reception device 200a determines whether or not the process is a first process (step S1). If the wireless reception device 200a determined the process is a first process ("YES" in step S1), the GI removing unit (for example, the GI removing unit 18a-1-1) removes the guard interval from the reception signal (step S2). Then, the FFT unit (for example, the FFT unit 20a-1-1) converts the signal from which the guard interval was removed to the frequency signal by fast fourier conversion (step S3).

Then, the signal separation unit 221a separates the signals which are spatially multiplexed by the MIMO system every subcarrier (step S4). Then, the demodulation unit (for example, the demodulation unit 223a-1) calculates the bit LLR using demodulating process based on the signal which was obtained in step S4 (step S5). Then, the decoding unit (for example, the decoding unit 224a-1) increases the reliability of the bit LLR which was obtained in step S5 by error correction decoding process (step S6).

Then, the wireless reception device 200a determines whether or not the number of performing the processes (steps S2 to S6) is over predetermined number (for example, 3 times) (step S7). If the wireless reception device 200a determines the number of performing the processes is not over the predetermined number ("NO" in step S7), the process of step S8 is performed.

Then, the symbol replica generation unit (for example, the symbol replica generation unit 281a) generates replica of modulation symbol based on the bit LLR (step S8). Then, IFFT unit (for example, the IFFT unit 283a-1) converts the signal obtained in step S8 into time signal by inverse fourier conversion (step S9). Then the pilot multiplexing unit (for example, the pilot multiplexing unit 285a-1) multiplexes the signal obtained in step S9 with pilot signal (step S10).

Then, GI insertion unit (for example, the GI insertion unit 286a-1) inserts guard interval into the signal obtained in the step S10 (step S11). The replica of transmission signal is generated by the processes of steps S8 to S11. After step S11, the wireless reception device 200a determines whether or not the process is a first process in step S1.

The processes of steps S2 to S6 are already performed. Therefore, the wireless reception device 200a determines "NO" in the step S1, and the process of step S12 is performed. In other words, the reception signal replica of predetermined delay wave is generated based on the replica of transmission signal generated in the steps S8 to S11, and adding unit (for example, the adding unit 17a-1-1) removes the reception signal replica from the reception signal. Therefore, the signals which are divided into blocks are generated (step S12). Then, GI removal unit (for example, the GI removal unit 18a-1-1) removes the guard interval from each signal which is divided into blocks (step S2), and the FFT unit (for example, the FFT unit 20a-1-1) converts the signal into frequency signal by fast fourier conversion (step S3). In step S4, if the process is a first process, block dividing process using delay wave replica is not performed. Therefore, the spatially multiplexed signal is separated based on the reception signal being received by the reception antennas. However, if block dividing process is performed, the signals which were divided into blocks are separated as the signals which are divided into blocks are the signals being received by the reception antennas.

Then, in steps S5 and S6, the demodulation unit for example, the demodulation unit 223a-1) performs demodulation, and the decoding unit for example, the decoding unit 224a-1) performs decoding process, and process of step S7 is performed. If the wireless reception device 200a determines that the number of the processes is not over the predetermined number in step S7, the processes of step S8 to S11 are performed.

If the wireless reception device 200a determines that the number of the processes is over the predetermined number ("YES" in step S7), the signal detection unit 22a outputs the information bit to the upper layer of the wireless reception device 200a. Then, the reception process is finished.

According to the first embodiment of the present invention, it is possible to generate a plurality of independent reception signals without increasing the number of reception antennas of the wireless reception device 200a. If the number of transmission antennas of the wireless transmission device 100a increases to increase throughput, it is possible to virtually increase the reception signals by dividing the multi-path. Therefore, good reception characteristics is obtained without increasing the number of reception antennas of the wireless reception device 200a. Therefore, a small wireless reception device is possible to communicate rapidly without depending on the number of reception antennas.

Second Embodiment

The second embodiment of the present invention is described below. In the second embodiment, the present invention applies to MIMO-SC (Single Carrier). Explanations of the second embodiment which are same as the first embodiment are omitted.

Figure 7:
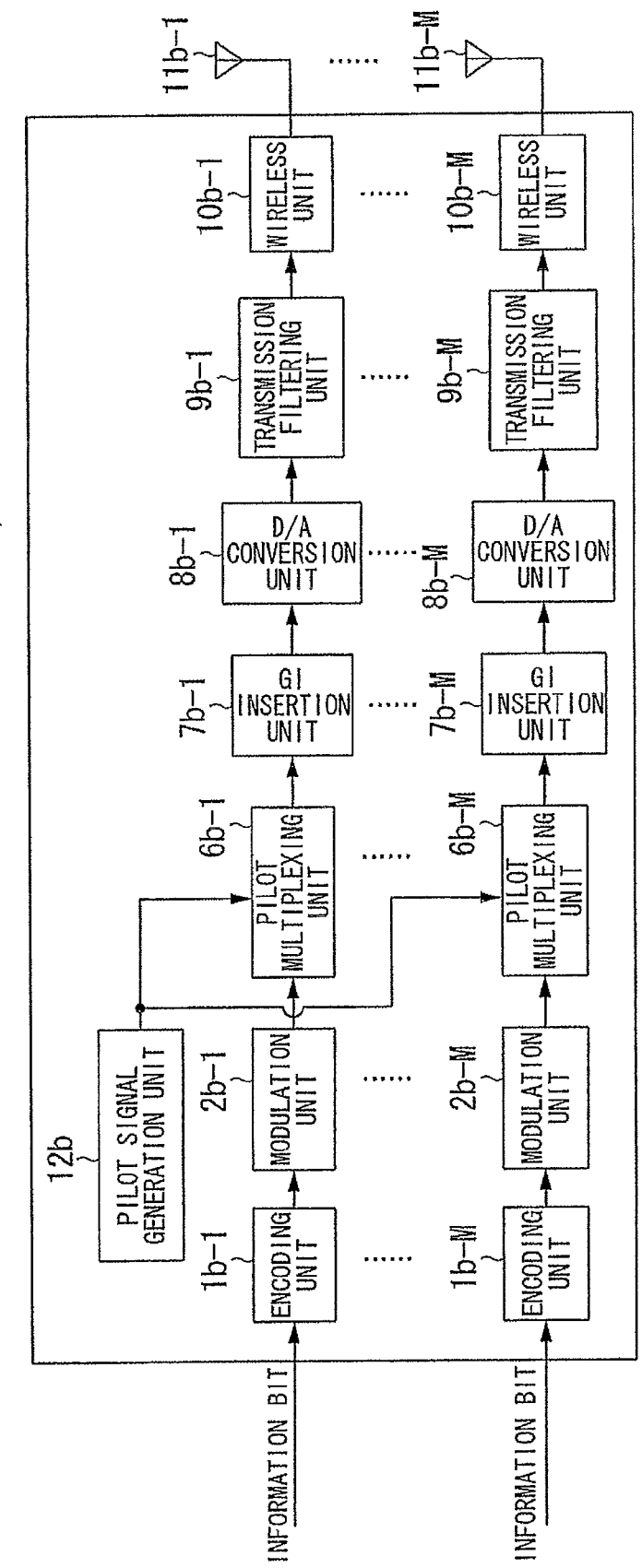
FIG. 7 is a schematic diagram showing a structure of a wireless transmission device 100b according to a second embodiment of the present invention.

FIG. 7 is a schematic diagram showing a structure of a wireless transmission device 100b according to a second embodiment of the present invention. The wireless transmission device 100b includes coding units 1b-1 to 1b-M, modulation units 2b-1 to 2b-M, pilot multiplexing units 6b-1 to 6b-M, GI insertion units 7b-1 to 7b-M, D/A conversion units 8b-1 to 8b-M, transmission filtering units 9b-1 to 9b-M, wireless units 10b-1 to 10b-M, transmission antennas 11b-1 to 11b-M, and a pilot signal generation unit 12b.

Information bits outputted from an upper layer of the wireless transmission device 100b are performed the error correction coding for example, the convolution coding or turbo coding) by the coding unit 1b-1, and mapped to a modulation symbol (for example, the QPSK, the 16 QAM) by the modulation unit 2b-1. The pilot signal generated by the pilot signal generation unit 12b is multiplexed to the signal which outputted by modulation unit 2b-1 by the pilot multiplexing unit 6b-1, and are inserted guard interval by the GI insertion unit 7b-1. Then, the signals are converted from digital signals to analog signals by the D/A conversion unit 8b-1, and are performed the waveform shaping by the transmission filtering unit 9b-1, and are converted to wireless frequency by the wireless unit 10b-1, are transmitted to the wireless reception device 200b (FIG. 8) via the transmission antenna 11b-1.

A plurality of transmission signals are generated in parallel based on the aforementioned processes, and transmitted to the wireless reception device 200b with the same frequency and the same timing via the plurality of transmission antennas 11b-1 to 11b-M.

In addition, the configuration of the coding units 1b-2 (not shown) to 1b-M, the modulation units 2b-2 (not shown) to 2b-M, the pilot multiplexing units 6b-2 (not shown) to 6b-M, the GI insertion units 7b-2 (not shown) to 7b-M, the D/A conversion units 8b-2 (not shown) to 8b-M, the transmission filtering units 9b-2 (not shown) to 9b-M, the wireless units 10b-2 (not shown) to 10b-M and the transmission antennas 11b-2 (not shown) to 11b-M are same as the configuration of the coding unit 1b-1, the modulation unit 2b-1, the pilot multiplexing unit 6b-1, the GI insertion unit 7b-1, the D/A conversion unit 8b-1, the transmission filtering unit 9b-1, the wireless unit 10b-1 and the transmission antenna 11b-1. Therefore, the explanations thereof are omitted.

Figure 8:
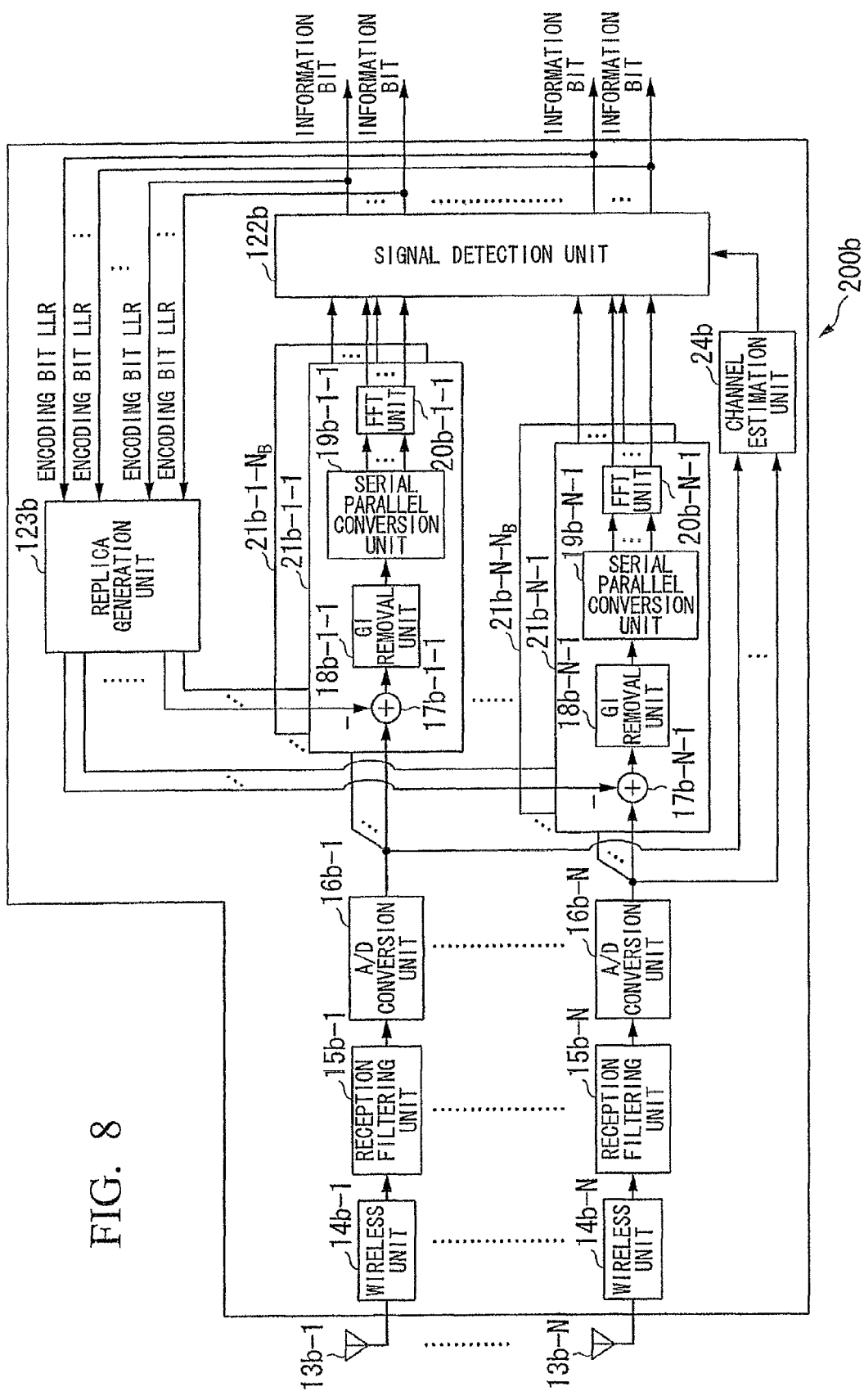
FIG. 8 is a schematic diagram showing a structure of a wireless reception device 200b according to the second embodiment of the present invention.

FIG. 8 is a schematic diagram showing a structure of a wireless reception device 200b according to the second embodiment of the present invention. The wireless reception device 200b includes reception antennas 13b-1 to 13b-N, wireless units 14b-1 to 14b-N, reception filtering units 15b-1 to 15b-N, A/D conversion units 16b-1 to 16b-N, block dividing units 21b-1-1 to 21b-1-$N_B$, ..., 21b-N-1 to 21b-N-$N_B$, a signal detection unit 122b, a replica generation unit 123b and a channel estimation unit 24b.

The block dividing unit 21b-1-1 includes an adding unit 17b-1-1, a GI removing unit 18b-1-1, a serial parallel conversion unit 19b-1-1 and an FFT unit 20b-1-1. In addition, the block dividing unit 21b-N-1 includes an adding unit 17b-N-1, a GI removal unit 18b-N-1, a serial parallel conversion unit 19b-N-1 and an FFT unit 20b-N-1. Other block dividing units also include the adding unit, the GI removal unit, serial parallel conversion unit and FFT unit.

Figure 9:
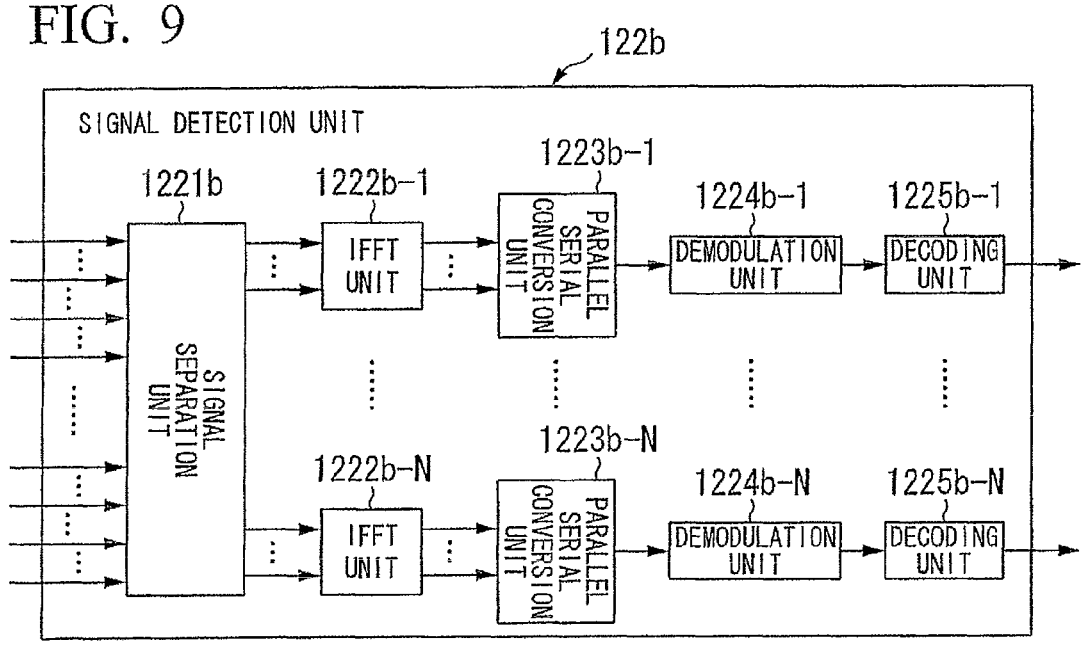
FIG. 9 is a schematic block diagram showing a structure of a signal detection unit 122b of the wireless reception device 200b according to the second embodiment of the present invention.

FIG. 9 is a schematic block diagram showing a structure of a signal detection unit 122b of the wireless reception device 200b according to the second embodiment of the present invention. The signal detection unit 122b includes a signal separation unit 1221b, IFFT units 1222b-1 to 1222b-N, parallel serial conversion units 1223b-1 to 1223b-N, demodulation units 1224b-1 to 1224b-N and decoding units 1225b-1 to 1225b-N.

The signal separation unit 1221b detects transmission symbol from the signals which are divided into the blocks outputted from the block dividing units 21b-1-1 to 21b-1-$N_B$, ..., 21b-N-1 to 21b-N-$N_B$ based on weighting value which is considered the formula (20-1), the formula (20-2), the formula (21-1) and the formula (21-2) or error in block dividing. Then, the signals are performed the frequency time conversion by the IFFT unit 1222b-1, and are performed the parallel serial conversion by the parallel serial conversion unit 1223, and calculated the bit LLR from the symbol by the demodulation unit 1224b-1, and are performed the error correction decoding process by the decoding unit 1225b-1, and outputted as bit LLR or information bit.

In addition, the configuration of the IFFT units 1222b-2 (not shown) to 1222b-N, the parallel serial conversion units 1223b-2 (not shown) to 1223b-N, the demodulation units 1224b-2 (not shown) to 1224b-N, the decoding unit 1225b-2 (not shown) to 1225b-N are the same as the configuration of the IFFT units 1222b-1, the parallel serial conversion units 1223b-1, the demodulation units 1224b-1, the decoding unit 1225b-1. Therefore, the explanations thereof are omitted.

Figure 10:
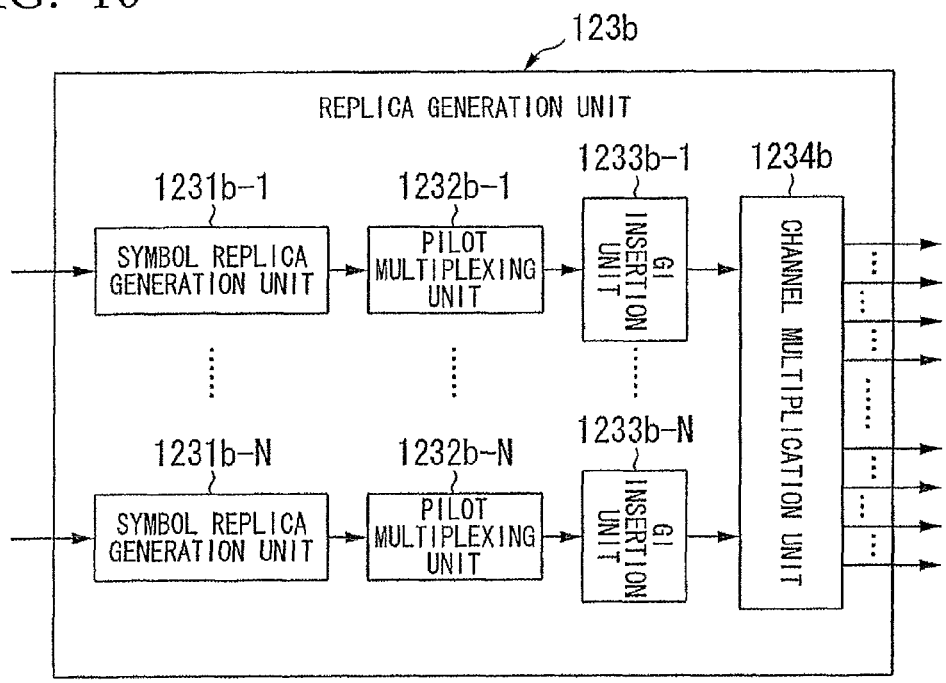
FIG. 10 is a schematic block diagram showing a structure of a replica generation unit 123b of the wireless reception device 200b according to the second embodiment of the present invention.

FIG. 10 is a schematic block diagram showing a structure of a replica generation unit 123b (FIG. 8) of the wireless reception device 200b according to the second embodiment of the present invention. The replica generation unit 123b includes symbol replica generation units 1231b-1 to 1231b-N, pilot multiplexing units 1232b-1 to 1232b-N, GI insertion units 1233b-1 to 1233b-N and a channel multiplication unit 1234b.

The bit LLR inputted in the symbol replica generation unit 1231b-1 generated as modulation symbol replica by the symbol replica generation unit 1231b-1, and are multiplexed the pilot signal by the pilot multiplexing unit 1232b-1, and are inserted the guard interval by the GI insertion unit 1233b-1. The channel multiplication unit 1234b generates replica signal for block dividing by convoluting channel separated into blocks from channel response.

In addition, the configuration of the symbol replica generation units 1231b-2 (not shown) to 1231b-N, the pilot multiplication units 1232b-2 (not shown) to 1232b-N, the GI insertion unit 1233-2 (not shown) to 1233-N are the same as the configuration of the symbol replica generation units 1231b-1, the pilot multiplication units 1232b-1, the GI insertion unit 1233-1. Therefore, the explanations thereof are omitted.

Figure 11:
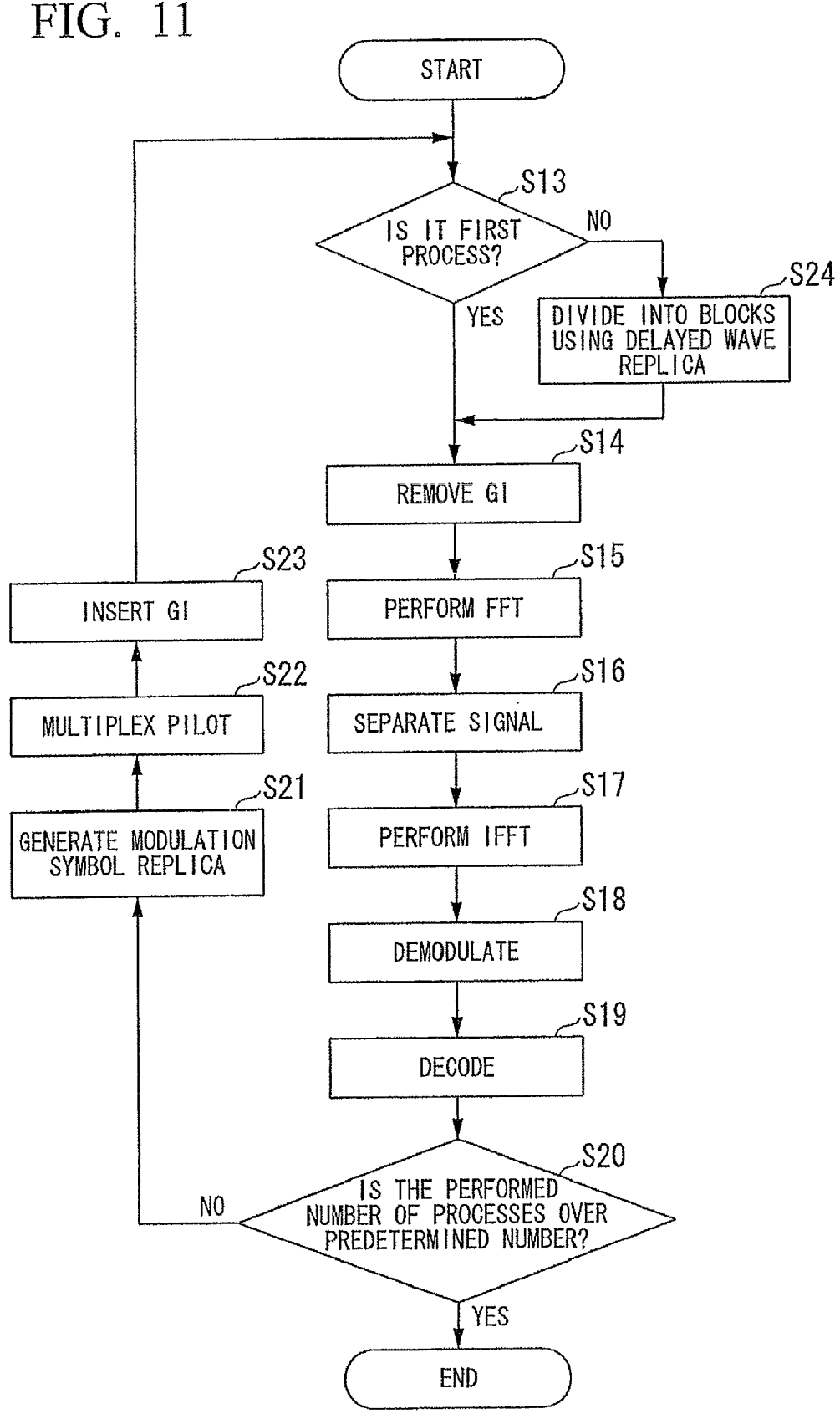
FIG. 11 is a flow chart showing the processes of the wireless reception device 200b according to the second embodiment of the present invention.

FIG. 11 is a flow chart showing the processes of the wireless reception device 200b according to the second embodiment of the present invention. First, the wireless reception device 200b determines whether or not the process is a first process (step S13). If the wireless reception device 200b determined the process is a first process ("YES" in step S13), the GI removing unit for example, the GI removing unit 18b-1-1) removes the guard interval from the reception signal (step S14).

Then, FFT unit for example, the FFT unit 20b-1-1) converts the signal obtained in the step S14 into frequency signal by performing the fast fourier conversion (step S15). Then, the signal separation unit 1221b separates the spatially multiplexed signal of MIMO system from the signal converted in step S15 for each subcarrier (step S16). Then, IFFT unit (for example IFFT unit 1222b-1) converts the signal into time signal by performing the inverse fast fourier conversion (step S17). Then, the demodulation unit for example, the demodulation unit 1224b-1) calculates bit LLR by performing demodulation process for the signal converted in step S17 (step S18).

Then, the decoding unit for example, the decoding unit 1225b-1) performs the error correction decoding process for the signal calculated in step S18 (step S19). Therefore, the reliability of the bit LLR increase. Then, the wireless reception device 200b determines whether or not the number of performing the processes (steps s14 to s19) is over predetermined number (for example, 3 times) (step S20).

If the wireless reception device 200b determines the number of performing the processes is not over the predetermined number ("NO" in step S20), the process of step S21 is performed.

In step S21, the symbol replica generation unit for example, the symbol replica generation unit 1231b-1) generates the replica of the modulation symbol from the bit LLR (step S21). Then, the pilot multiplexing unit for example, the pilot multiplexing unit 1232b-1) multiplexes the signal generated in step S21 with the pilot signal (step S22). Then, the GI insertion unit for example, the GI insertion unit 1233b-1) inserts the guard interval into the signal generated in the step S22 (step S23).

The replica of transmission signal is generated by the processes of steps S21 to S23. After step S23, the wireless reception device 200b determines again whether or not the process is a first process in step S13. The wireless reception device 200b determines that the process is not first process ("NO" in step S13), reception signal replica of predetermined delay wave element are generated from the replica of the transmission signal. The adding unit for example, the adding unit 17b-1-1) removes the reception signal replica from the reception signal, and the signals which are divided into blocks are generated (step S24). Then, the GI removal unit for example, the GI removal unit 18b-1-1) removes the guard interval from each signal divided into the blocks from each signals (step S14). Then, FFT unit 20b-1-1 converts the signals into frequency signals by performing the fast fourier conversion (step S15). Then, the signal separation unit 1221b regards the signals which are divided into blocks as the signals which are received at the reception antennas, and separates spatially multiplexed signal (step S16).

Then, IFFT unit for example, the IFFT unit 1222b-1) converts the signals generated in step S16 into time signals by performing the inverse fast fourier conversion (step S17). Then, the demodulation unit for example, the demodulation unit 1224b-1) performs demodulation process (step S18). Then, the decoding unit for example, the decoding unit 1225b-1) performs the decoding process (step S19). Then, the wireless reception device 200b determines whether or not the number of performing process is over predetermined number in step S20. If the number of performing process is not over predetermined number ("NO" in step S20), the step S21 is performed again. If the number of performing process is over predetermined number ("YES" in step S20), information bit is an outputted to the upper layer of the wireless reception device 200b, and the reception process is finished.

According to the second embodiment of the present invention, it is possible to generate a plurality of independent reception signals without increasing the number of reception antennas of the wireless reception device 200b. If the number of transmission antennas of the wireless transmission device 100b increases to increase throughput, it is possible to virtually increase the reception signals by dividing the multi-path. Therefore, good reception characteristics is obtained without increasing the number of reception antennas of the wireless reception device 200b. Therefore, a small wireless reception device is possible to communicate rapidly without depending on the number of reception antennas.

Third Embodiment

The third embodiment of the present invention is described below. In the third embodiment, the present invention applies to MIMO-MC-CDMA (Multi Carrier-Code Division Multiplexing). The code multiplex number is Cn. Explanations of the third embodiment which are the same as the first embodiment are omitted.

Figure 12:
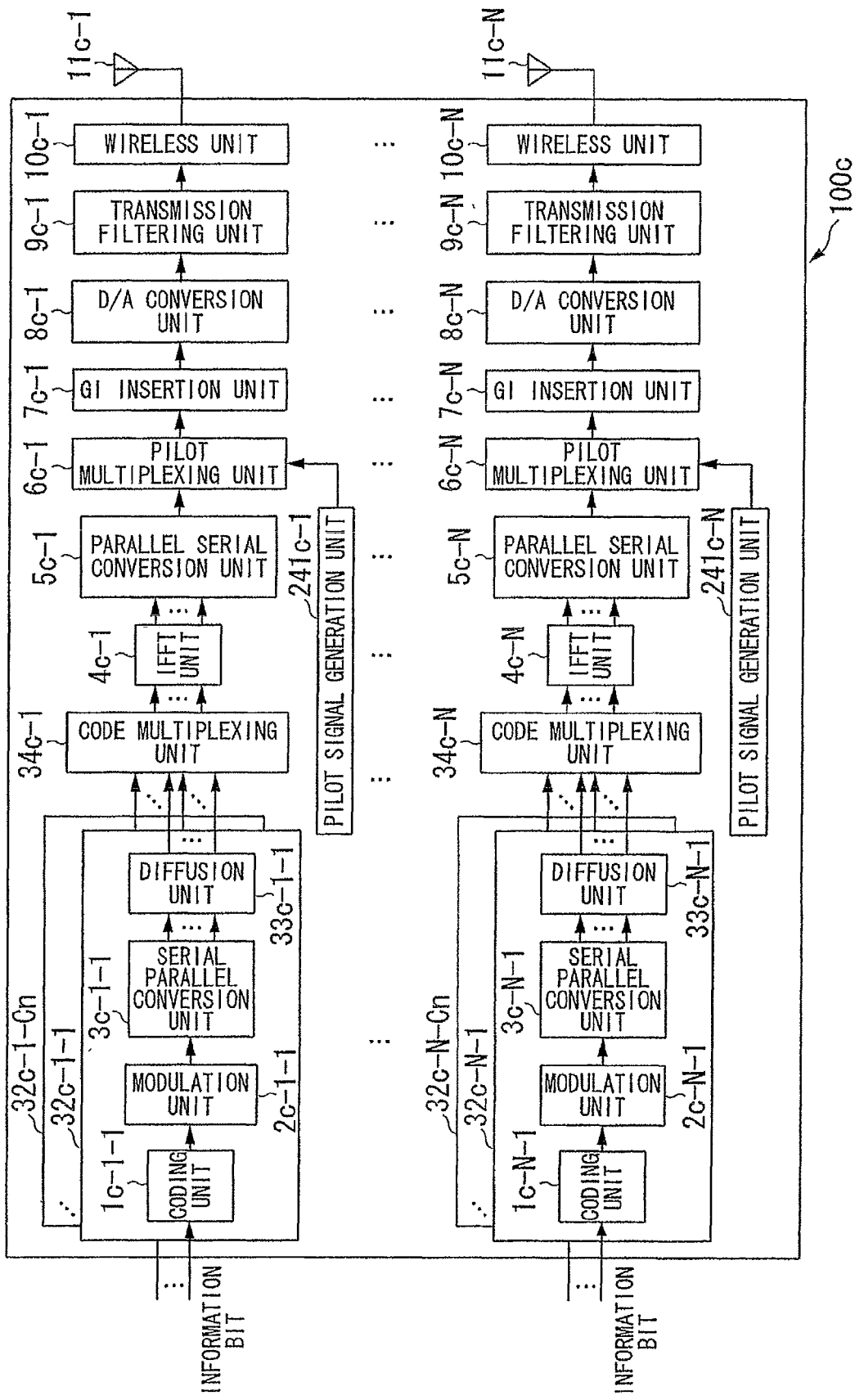
FIG. 12 is a schematic block diagram showing a structure of a wireless transmission device 100c according to a third embodiment of the present invention.

FIG. 12 is a schematic block diagram showing a structure of a wireless transmission device 100c according to a third embodiment of the present invention. The wireless transmission device 100c includes code channel signal generation units 32c-1-1 to 32c-1-Cn, . . . , 32c-M-1 to 32c-M-Cn, code multiplexing units 34c-1 to 34c-M, IFFT units 4c-1 to 4c-M, parallel serial conversion units 5c-1 to 5c-M, pilot multiplexing units 6c-1 to 6c-M, GI insertion units 7c-1 to 7c-M, D/A conversion units 8c-1 to 8c-M, transmission filtering units 9c-1 to 9c-M, wireless units 10c-1 to 10c-M, transmission antennas 11c-1 to 11c-M and pilot signal generation units 241c-1 to 241c-M.

The code channel signal generation unit 32c-1-1 includes a coding unit 1c-1-1, modulation unit 2c-1-1, a serial parallel conversion unit 3c-1-1 and a diffusion unit 33-1-1. In addition, the code channel signal generation unit 32-N-1 includes a coding unit 1c-N-1, a modulation unit 2c-N-1, a serial parallel conversion unit 3c-N-1 and a diffusion unit 33-N-1. Other code channel signal generation units also include coding unit, modulation unit, serial parallel conversion unit and diffusion unit.

The information bits outputted from the upper layer of the wireless transmission device 100c are processed in parallel by the code channel signal generation units 32c-1-1 to 32c-1-Cn, . . . , 32c-N-1 to 32c-N-Cn. The information bits are coded using error correction coding for example, the convolution coding or the turbo coding) by the coding unit 1c-1-1. The modulation unit 2c-1-1 performs mapping the coding bit coded by the coding unit 1c-1-1 to the modulation symbol (for example, the QPSK, the 16 QAM).

The modulation symbol modulated by the modulation unit 2c-1-1 is performed serial parallel conversion by the serial parallel conversion unit 3c-1-1, and are diffused using the diffusion code by the diffusion unit 33c-1-1. The signal diffused by the diffusion unit 33c-1-1 is the output signal of the code channel generation unit 32c-1-1. Similar processes are performed in parallel at the code channel signal generation units 32c-1-2 (not shown) to 32c-1-Cn, . . . , 32c-M-1 to 32c-M-Cn.

The output signals of the code channel signal generation units 32c-1-1 to 32c-1-Cn are performed the code multiplexing by the code multiplexing unit 34c-1. Then, the signals are performed the frequency time conversion by the IFFT unit 4c-1, are performed the parallel serial conversion by the parallel serial conversion unit 5c-1, and are multiplexed pilot signal generated in the pilot signal generation unit 241c by the pilot multiplexing unit 6c-1, and are inserted guard interval by the GI insertion unit 7c-1, and are performed the D/A conversion by the D/A conversion unit 8c-1, and are performed the waveform shaping by the transmission filtering unit 9c-1, and are converted to wireless frequency by the wireless unit 10c-1, and are transmitted by the transmission antennas. The transmission signals are generated in parallel, and are transmitted from the wireless transmission device 100c to the wireless reception device 200c by a plurality of transmission antennas 11c-1 to 11c-M using same frequency and the same timing.

In addition, the configurations of the code multiplexing units 34c-2 (not shown) to 34c-M, the IFFT units 4c-2 (not shown) to 4c-M, the parallel serial conversion units 5c-2 (not shown) to 5c-M, the pilot multiplexing units 6c-2 (not shown) to 6c-M, the GI insertion units 7c-2 (not shown) to 7c-M, the D/A conversion units 8c-2 (not shown) to 8c-M, the transmission filtering units 9c-2 (not shown) to 9c-M, the wireless units 10c-2 (not shown) to 10c-M, the transmission antennas 11c-2 (not shown) to 11c-M and the pilot signal generation units 241c-2 (not shown) to 241c-M are the same as the code multiplexing units 34c-1, the IFFT units 4c-1, the parallel serial conversion units 5c-1, the pilot multiplexing units 6c-1, the GI insertion units 7c-1, the D/A conversion units 8c-1, the transmission filtering units 9c-1, the wireless units 10c-1, the transmission antennas 11c-1 and the pilot signal generation units 241c-1. Therefore, the explanations thereof are omitted.

Figure 13:
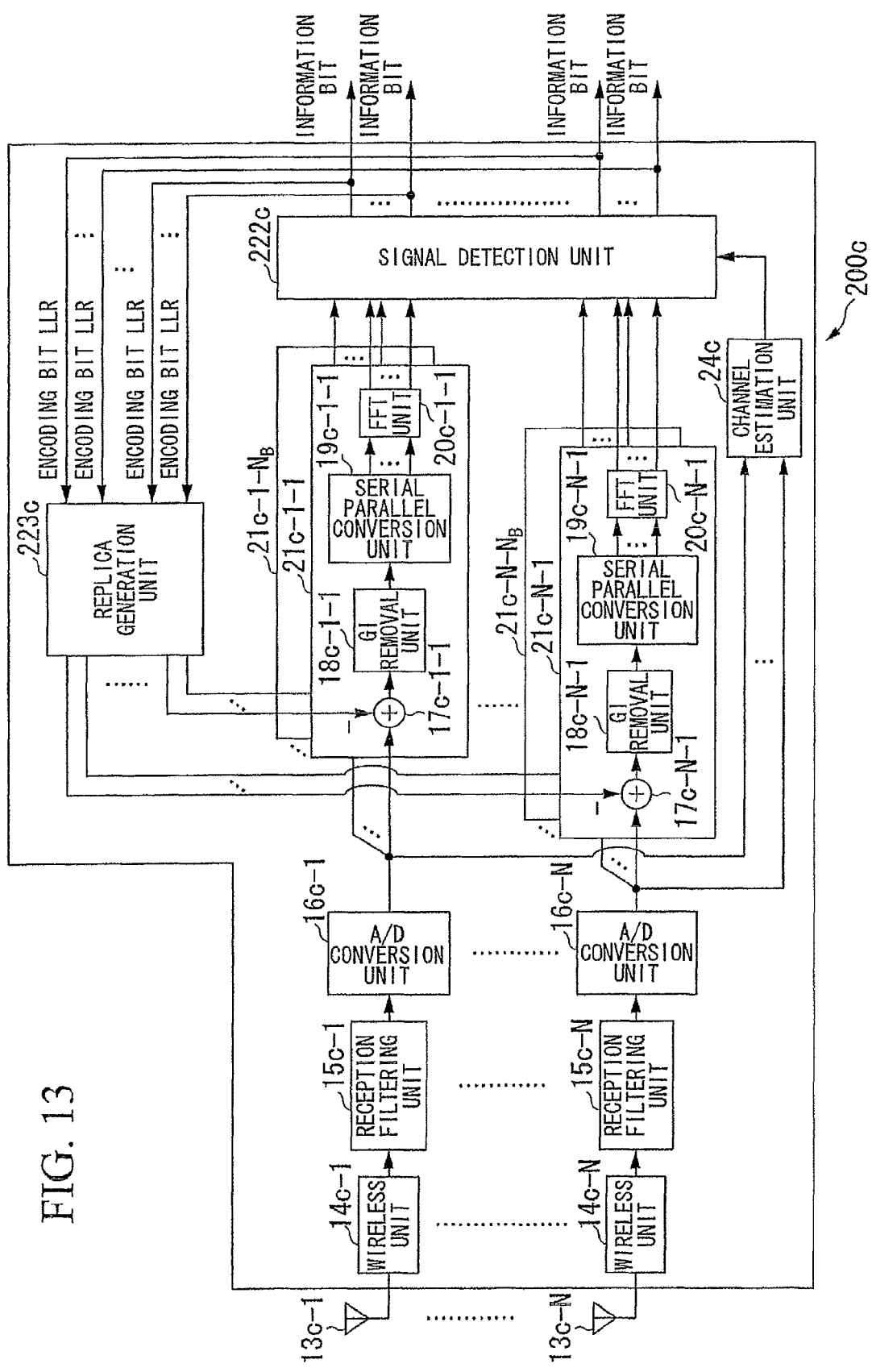
FIG. 13 is a schematic block diagram showing a structure of a wireless reception device 200c according to the third embodiment of the present invention.

FIG. 13 is a schematic block diagram showing a structure of a wireless reception device 200c according to the third embodiment of the present invention. The wireless reception device 200c includes reception antennas 13c-1 to 13c-N, wireless units 14c-1 to 14c-N, reception filtering units 15c-1 to 15c-N, A/D conversion units 16c-1 to 16c-N, block dividing units 21c-1-1 to 21c-1-$N_B$, ..., 21c-N-1 to 21c-N-$N_B$, a signal detection unit 222c, replica generation unit 223c and a channel estimation unit 24c.

The block dividing unit 21c-1-1 includes an adding unit 17c-1-1, a GI removal unit 18c-1-1, a serial parallel conversion unit 19c-1-1 and an FFT unit 20c-1-1. In addition, The block dividing unit 21c-N-1 includes an adding unit 17c-N-1, a GI removal unit 18c-N-1, a serial parallel conversion unit 19c-N-1 and an FFT unit 20c-N-1. Other block dividing units also includes the adding unit, GI removal unit, serial parallel conversion unit and FFT unit.

Figure 14:
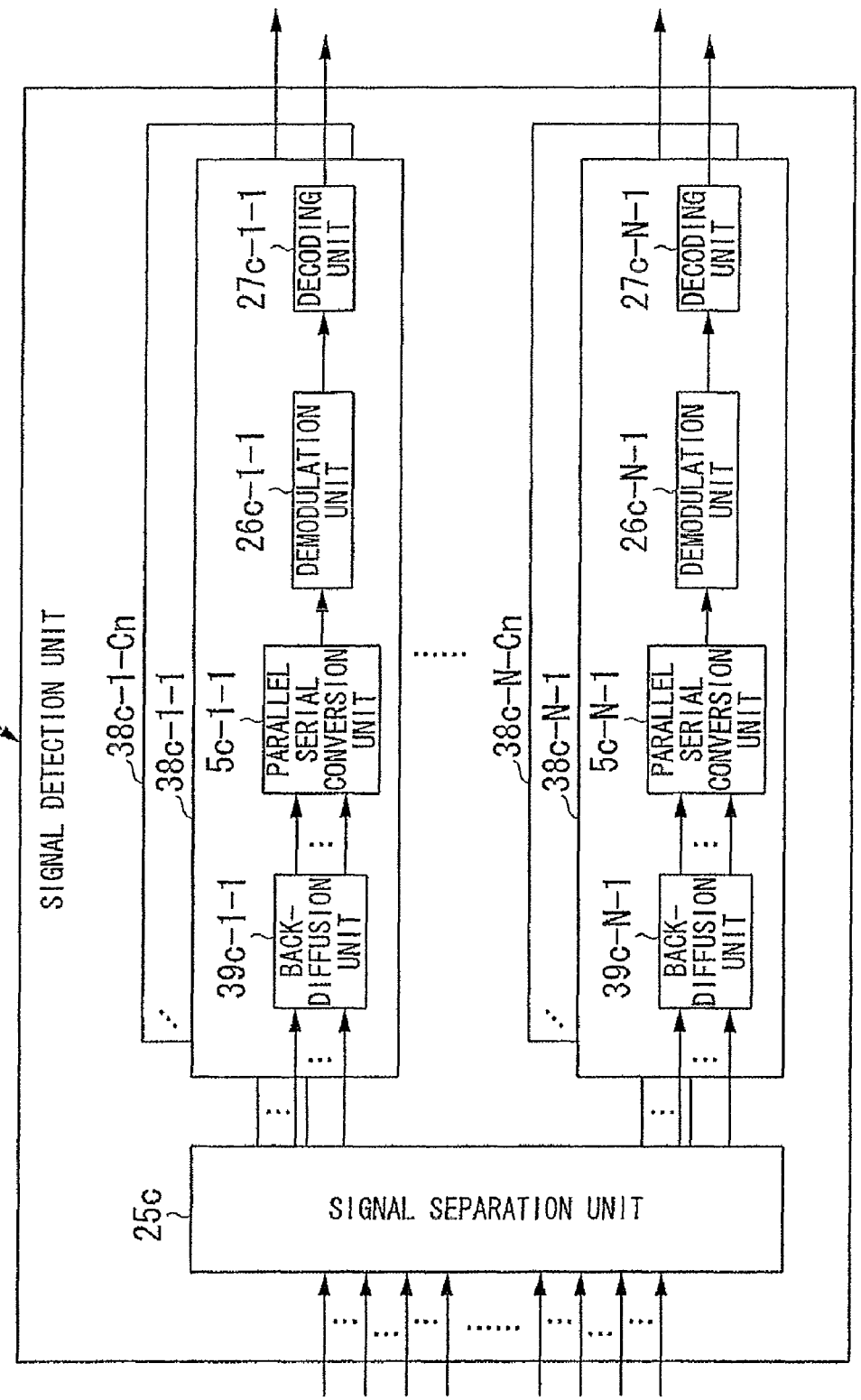
FIG. 14 is a schematic block diagram showing a structure of a signal detection unit 222c of the wireless reception device 200c according to the third embodiment of the present invention.

FIG. 14 is a schematic block diagram showing a structure of a signal detection unit 222c of the wireless reception device 200c (FIG. 13) according to the third embodiment of the present invention. The signal detection unit 222c includes a signal separation unit 25c, a code channel separation units 38c-1-1 to 38c-1-Cn, ..., 38c-N-1 to 38c-N-Cn. The code channel separation unit 38c-1-1 includes an inverse diffusion unit 39c-1-1, a parallel serial conversion unit 5c-1-1, a demodulation unit 26c-1-1 and decoding unit 27c-1-1. In addition, the code channel separation unit 38c-N-1 includes an inverse diffusion unit 39c-N-1, a parallel serial conversion unit 5c-N-1, demodulation unit 26c-N-1 and decoding unit 27c-N-1. In addition, other code channel separation units also include the inverse diffusion unit, the parallel serial conversion unit, the demodulation unit and the decoding unit.

The signal separation unit 25c performs MIMO signal separation, like the first embodiment, based on block divided signal outputted from the block dividing units 21c-1-1 to 21c-1-$N_B$, ..., 21c-N-1 to 21c-N-$N_B$, using the formula (20-1), the formula (20-2), the formula (21-1) and the formula (21-2). In addition, considering the signals are performed the code multiplexing, the formula (24-1), the formula (24-2), the formula (25-1) and the formula (25-2) described below may be used.

$$M_{ZF}(k)=H^H(k)(C_nH(k)H^H(k))^{-1} \quad \text{(Formula 24-1)}$$

$$M_{ZF}(k)=(C_nH^H(k)H(k))^{-1}H^H(k) \quad \text{(Formula 24-2)}$$

$$M_{MMSE}(k)=H^H(k)(C_nH(k)H^H(k)+\sigma^2I)^{-1} \quad \text{(Formula 25-1)}$$

$$M_{MMSE}(k)=(C_nH(k)H^H(k)+\sigma^2I)^{-1}H^H(k) \quad \text{(Formula 25-2)}$$

In addition, when the formula (24-1), the formula (24-2), the formula (25-1) and the formula (25-2) are used, like the first embodiment, the weight which is considering the error in block dividing may be used.

The signals which was performed MIMO signal separation by the signal separation unit 25c are inputted to the code channel separation units 38c-1-1 to 38c-1-Cn, ..., 38c-N-1 to 38c-N-Cn. In the code channel separation units 38c-1-1 to 38c-1-Cn, ..., 38c-N-1 to 38c-N-Cn, the inverse diffusion units 39c-1-1 to 39c-1-Cn performs inverse diffusion for the input signals using corresponding diffusion code. The signals performed inverse diffusion are performed the parallel serial conversion by the parallel serial conversion unit 5c-1-1, and are converted from the signals performed inverse diffusion to bit LLR by the demodulation unit 26c-1-1, are performed the error correction decoding process by the decoding unit 27c-1-1, and are outputted as bit LLR updated likelihood or information bit.

In addition, the configurations of the code channel separation units 38c-1-2 (not shown) to 38c-1-Cn, ..., 38c-N-1 to 38c-N-Cn are the same as the code channel separation unit 38c-1-1. Therefore, the explanations thereof are omitted.

Figure 15:
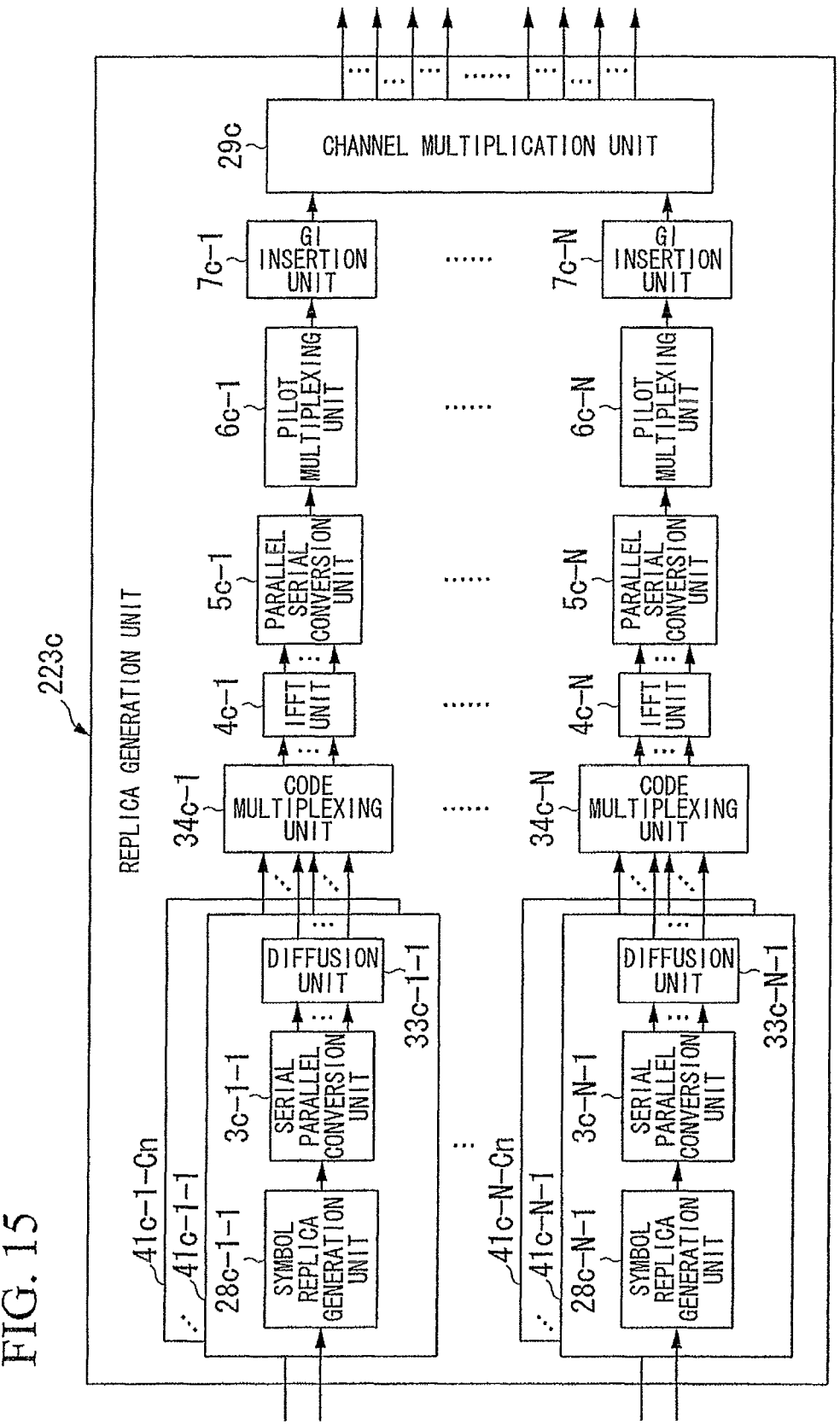
FIG. 15 is a schematic block diagram showing a structure of a replica generation unit 223c (FIG. 13) of the wireless reception device 200c according to the third embodiment of the present invention.

FIG. 15 is a schematic block diagram showing a structure of a replica generation unit 223c (FIG. 13) of the wireless reception device 200c (FIG. 13) according to the third embodiment of the present invention. The replica generation unit 223c includes code channel replica generation units 41c-1-1 to 41c-1-Cn, ..., 41c-N-1 to 41c-1-Cn, code multiplexing units 34c-1 to 34c-N, IFFT units 4c-1 to 4c-N, parallel serial conversion units 5c-1 to 5c-N, pilot multiplexing units 6c-1 to 6c-N, GI insertion units 7c-1 to 7c-N and a channel multiplication unit.

The signal detection unit 222c supplies the bit LLR to the replica generation unit 223c. The bit LLR outputted from the replica generation unit 223c are inputted to the code channel replica generation units 41c-1-1 to 41c-1-Cn, ..., 41c-N-1 to 41c-N-Cn, and are generated the replica of the modulation symbol by the symbol replica generation unit 28c-1-1, are performed the serial parallel conversion by the serial parallel conversion unit 3c-1-1, and are diffused using corresponding diffusion code by the diffusion unit 33c-1-1, and are generated the code channel replica. The generated code channel replica is performed code multiplexing by the code multiplexing unit 34c-1-1, and are performed the frequency time conversion by the IFFT unit 4c-1-1, and are performed the parallel serial conversion by the parallel serial conversion unit 5c-1-1, and are multiplexed the pilot signal by the pilot multiplexing unit 6c-1-1, and are inserted the guard interval by the GI insertion unit 7c-1-1. Then, by convoluting the signal with the block divided channel by the channel multiplication unit 29c, the signal for block dividing is generated.

Figure 16:
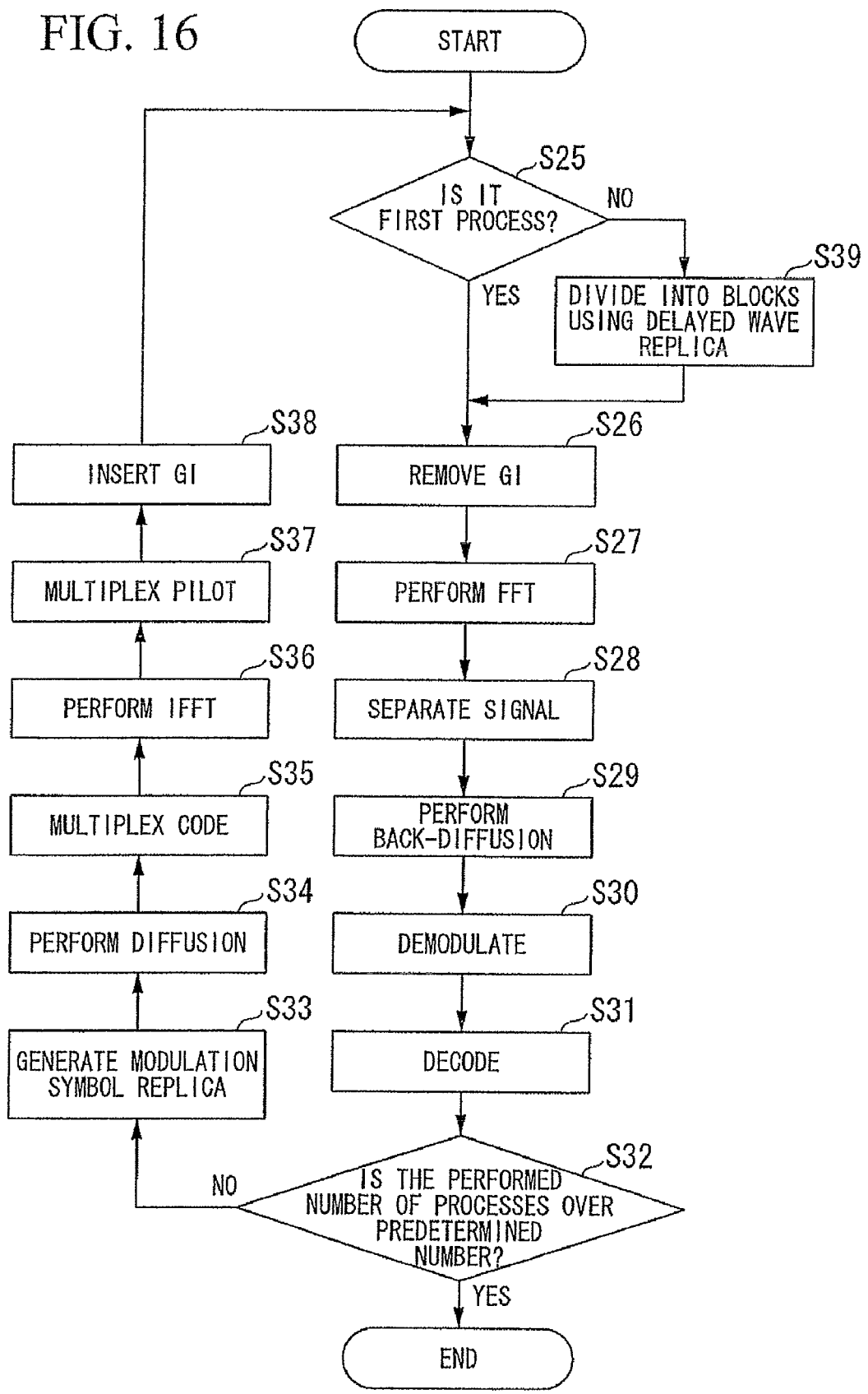
FIG. 16 is a flowchart showing the processes of the wireless reception device 200c according to the third embodiment of the present invention.

FIG. 16 is a flowchart showing the processes of the wireless reception device 200c according to the third embodiment of the present invention. First, the wireless reception device 200c determines whether or not the process is a first process (step S25). If the wireless reception device 200c determines the process is a first process ("YES" in step S25), the GI removal unit for example, the GI removal unit 18c-1-1) removes the guard interval from the reception signal (step S26). Then, the FFT unit for example, the FFT unit 20c-1-1) converts the signal generated in step S26 to the frequency signal by the fast fourier conversion (step S27).

The signal separation unit 25c separates the spatially multiplexed signal by the MIMO system, for each subcarrier, from the signal generated in the step S27 (step S28). Then, the inverse diffusion unit for example, the inverse diffusion unit 39c-1-1) calculates the signals of each code channel by performing the inverse diffusion process to the signal generated in the step S28 (step S29).

Then, the demodulation unit for example, the demodulation unit 26c-1-1) calculates the bit LLR by performing demodulation process for the signal obtained in the step S29 (step S30). Then, the decoding unit for example, the decoding unit 27c-1-1) increases the reliability of the bit LLR by performing the error correction decoding process for the signal obtained in the step S30 (step S31).

Then, the wireless reception device 20c determines whether or not the number of performing the processes (steps S26 to S31) is over predetermined number for example, 3 times) (step S32). If the number of performing the processes is not over the predetermined number, the process of the step S33 is performed.

Then, the symbol replica generation unit for example, the symbol replica generation unit 41c-1-1) generates the replica of the modulation symbol from the bit LLR (step S33). Then, the diffusion unit for example, the diffusion unit 33c-1-1) performs diffusion process for the signal obtained in the step S33 (step S34). Then, the code multiplexing unit 34c-1 performs code multiplexing for the signal obtained in the step S34 (step S35). Then, IFFT unit for example, the IFFT unit 4c-1) converts inverse fast fourier conversion process for the signal obtained in the step S35 (step S36).

Then, the pilot multiplexing unit for example, the pilot multiplexing unit 6c-1) multiplexes the pilot signal to the signal obtained in the step S36 (step S37). Then, the GI insertion unit 7c-1 inserts the guard interval to the signal obtained in the step S37 (step S38). In the steps S33 to S38, replica of the transmission signal is generated. After the process of the step S38, the wireless reception device 200c determines whether or not the process is a first process (step S25). If the wireless reception device 200c determines the process is not first process ("NO" in the step S25), reception signal replica of predetermined delay wave element is generated, and the adding unit for example, the adding unit 17c-1-1) removes the reception signal replica from the reception signal, and block-divided signal is generated.

Then, the GI removal unit 18c-1-1 removes the guard interval from each block-divided signal (step S26), and the FFT unit for example, the FFT unit 20c-1-1) converts the signal into frequency signal by performing fast fourier conversion process (step S27).

Then, the signal separation unit 25c separates spatially multiplexed signal by regarding block-divided signal as the signal being received by each of the reception antennas (step S28). Then, the inverse diffusion unit for example, the inverse diffusion unit 39c-1-1) performs inverse diffusion process (step S29), and the demodulation unit for example, the demodulation unit 26c-1-1) performs demodulation process (step S30), and the decoding unit for example, the decoding unit 27c-1-1) performs decoding process (step S31). Then, the wireless reception device 200c determines again in step S32 whether the process is performed predetermined number. If the process is not performed predetermined number, the process of the step S33 is performed again. If the process is performed predetermined number ("YES" in the step S32), information bit is supplied to the upper layer of the wireless reception device 200c, and the reception process is finished.

According to the third embodiment of the present invention, it is possible to generate a plurality of independent reception signals without increasing the number of reception antennas of the wireless reception device 200c. If the number of transmission antennas of the wireless transmission device 100c increases to increase throughput, it is possible to virtually increase the reception signals by dividing the multi-path. Therefore, good reception characteristics is obtained without increasing the number of reception antennas of the wireless reception device 200c. Therefore, a small wireless reception device is possible to communicate rapidly without depending on the number of reception antennas.

Fourth Embodiment

The fourth embodiment of the present invention is described below. In the first to third embodiments, the criteria of block dividing of each of the reception antennas is same, and all reception antennas use same block dividing number. In the fourth embodiment, MIMO-OFDM is used. In addition, the fourth embodiment may be used in MIMO-SC and MIMO-MC-CDM which use frequency region equalization.

In addition, the wireless transmission device according to the fourth embodiment is same as the wireless transmission device 100a (FIG. 1). Therefore, the explanation thereof is omitted. Explanations of the fourth embodiment which are the same as the first embodiment are omitted.

Figure 17:
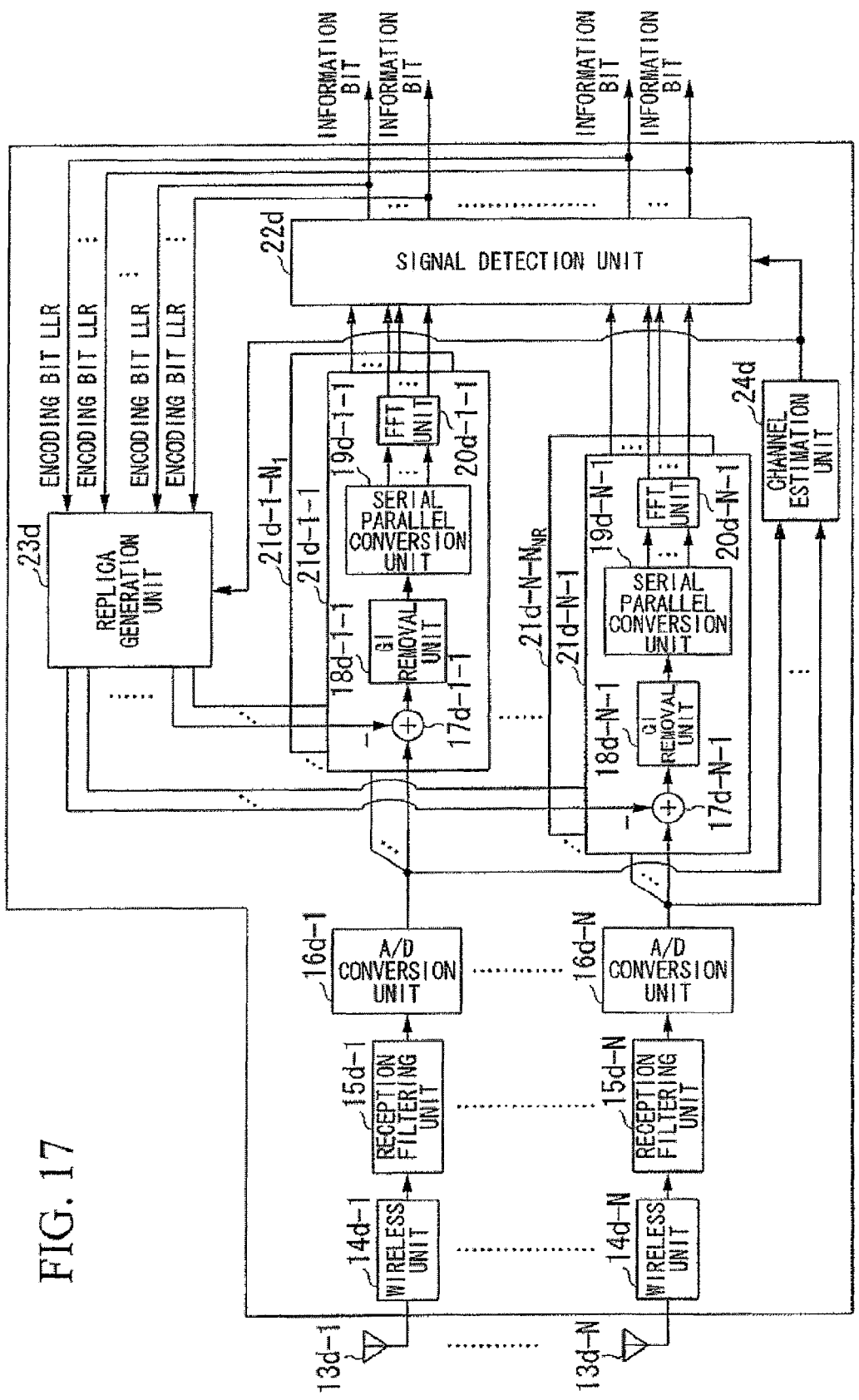
FIG. 17 is a schematic block diagram showing a structure of a wireless reception device 200d according to a fourth embodiment of the present invention.

FIG. 17 is a schematic block diagram showing a structure of a wireless reception device 200d according to a fourth embodiment of the present invention. The wireless reception device 200d includes reception antennas 13d-1 to 13d-N, wireless units 14d-1 to 14d-N, reception filtering units 15d-1 to 15d-N, A/D conversion units 16d-1 to 16d-N, block dividing units 21d-1-1 to 21d-1-$N_1$, ..., 21d-N-1 to 21d-N-$N_{NR}$, a signal detection unit 22d, a replica generation unit 23d and a channel estimation unit 24d.

The block dividing unit 21d-1-1 includes an adding unit 17d-1-1, a GI removal unit 18d-1-1, a serial parallel conversion unit 19d-1-1, an FFT unit 20d-1-1. In addition, the block dividing unit 21d-N-1 includes an adding unit 17d-N-1, a GI removal unit 18d-N-1, a serial parallel conversion unit 19d-N-1 and an FFT unit 20d-N-1. Other block dividing units also include the adding unit, the GI removal unit, the serial parallel conversion unit and the FFT unit.

It is different form the first embodiment that the block dividing number used by the block dividing units 21d-1-1 to 21d-1-$N_1$, ..., 21d-N-1 to 21d-N-$N_{NR}$ is different in each antennas. The block dividing number of the reception antenna 13d-1 is $N_1$, and the block dividing number of the reception antenna 13d-2 (not shown) is $N_2$, ..., the block dividing number of the reception antenna 13d-N is $N_{NR}$. In this case, the signals divided into blocks are $N_1$ to $N_{NR}$ in each of the reception antennas. Therefore, it is possible to virtually regard $N_T$-row by $N_R$-column MIMO system as the MIMO system which is represented the formula (26) described below.

$$M_{MMSE}(k) = (C_n H(k) H^H(k) + \sigma^2 I)^{-1} H^H(k) \quad \text{(Formula 26)}$$

In addition, N1 to NNR may be decided every reception antenna, some reception antennas may not perform block dividing. The criteria of block dividing number may be decided based on the channel of each of the reception antennas.

Figure 18:
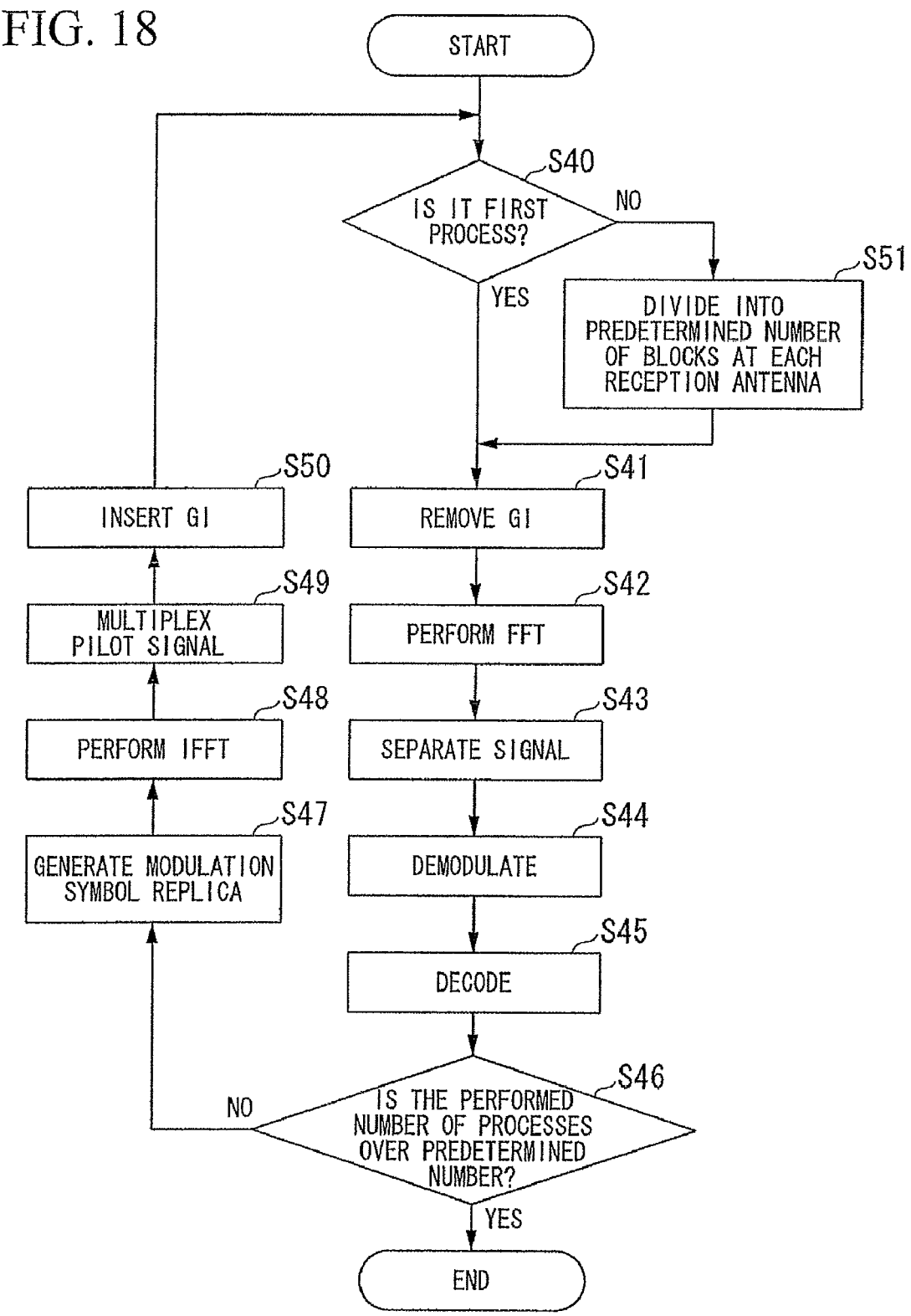
FIG. 18 is a flowchart showing the processes of the wireless reception device 200d according to the fourth embodiment of the present invention.
Figure 19:
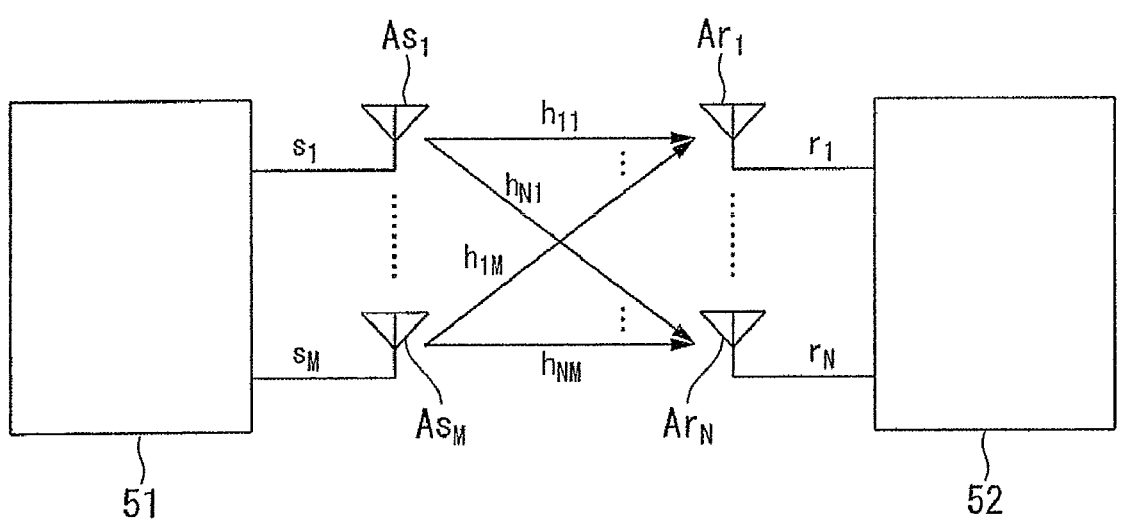
FIG. 19 is an explanation diagram of a conventional MIMO system.

FIG. 18 is a flowchart showing the processes of the wireless reception device 200d according to the fourth embodiment of the present invention. First, the wireless reception device 200d determines whether or not the process is a first process (step S40). If the wireless reception device 200d determines the process is a first process ("YES" in the step S40), the GI removal unit for example, the GI removal unit 18d-1-1) removes the guard interval from the reception signal (step S41). Then, FFT unit for example, the FFT unit 20d-1-1) converts the signal which was removed the guard interval to the frequency signal by fast fourier conversion (step S42). Then, the signal detection unit 22d separates spatially multiplexed signal in each subcarrier by the MIMO (step S43).

Then, the signal detection unit 22d calculates the bit LLR by demodulation process (step S44). Then, the signal detection unit 22d increases the reliability of the bit LLR by error correction decoding process (step S45).

Then, the wireless reception unit 200d determines whether or not the process is performed predetermined number (for example, 3 times). If the wireless reception device 200d determines the process is not performed predetermined times ("NO" in the step S46), the process of step S47 is performed. Then, the replica generation unit 23d generates the modulation symbol from the bit LLR obtained in the step S45 (step S47). Then, the replica generation unit 23d converts the signal obtained in the step S47 to the time signal by inverse fast fourirer conversion (step S48). Then, the replica generation unit 23d multiplexes the pilot signal to the signal obtained in the step S48 (step S49). Then, the replica generation unit 23d inserts the guard interval into the signal obtained in the step S49 (step S50). In the steps S47 to S50, the replica of the transmission signal is generated.

After the process of the step S50, the wireless reception device 200d determines again whether the process is a first process. If the wireless reception device 200d determines the process is not first process ("NO" in the step S40), the process of the step S51 is performed. In other words, reception signal replica of the predetermined delay wave element is generated based on the replica of the transmission signal generated in the step S50, and the adding unit for example, the adding unit 17d-1-1) removes the reception signal replica from the reception signal, and block-divided signal is generated (step S51). In the step S51, the block dividing number is decided every reception antennas, at least one reception antennas divide the signal into blocks. Then, the GI removal unit for example, the GI removal unit 18d-1-1) removes the guard interval from each signals which was divided into blocks (step S41), and the FFT unit (FFT unit 20d-1) converts the signal to the frequency signal by fast fourier conversion (step S42).

In step S43, the each block-divided signals are regarded as the signals being received by the reception antennas, and the separation of the spatially multiplexed signals is performed. Then, in steps S44 and S45, the signal detection unit 22d performs demodulation process and decoding process, and the process of step S46 is performed. In step S46, the wireless reception device 200d determines the predetermined number processes are not performed, the process of S47 is performed. If the wireless reception device 200d determines the predetermined number processes are performed ("YES" in the step S46), the information bits are supplied to the upper layer of the wireless reception device 200d, and the reception process is finished.

According to the fourth embodiment of the present invention, it is possible to generate a plurality of independent reception signals without increasing the number of reception antennas of the wireless reception device 200d. If the number of transmission antennas of the wireless transmission device 100d increases to increase throughput, it is possible to virtually increase the reception signals by dividing the multi-path. Therefore, good reception characteristics is obtained without increasing the number of reception antennas of the wireless reception device 200d. Therefore, a small wireless reception device is possible to communicate rapidly without depending on the number of reception antennas.

In addition, in the fourth embodiment, the block dividing suitable for various situations is performed by changing the criteria of block dividing in every reception antennas. For example, if there are first reception antenna whose reception electric power is low and second reception antenna whose reception electric power is high, the block dividing number is reduced in the first reception antenna, and the block dividing number is increased in the second antenna. Therefore, it is possible to select the block dividing number suitable for every reception antennas, and high reliability reception process is performed.

In aforementioned embodiments, the linear process (for example, the ZFD, the MMSED) is used for the signal separation of the MIMO. However, the non-linear process (for example, the MLD (the Maximum Likelihood Detection), the V-BLAST (the Vertical-Bell Laboratories lAyered Space-Time)) may be used. In addition, other method capable of signal separation of the MIMO may be used.

In addition, in aforementioned embodiments, the reception signal is used for block dividing using the modulation symbol replica generated by the wireless reception device. However, the replica of the signals transmitted from some transmission antennas may be generated, and the reception replica may be reduced from the reception signal, and after the nose of other antennas are removed, the signal detection may be performed.

In addition, in aforementioned embodiments, the independent signals of every transmission antennas of the wireless transmission device are transmitted. However, a plurality of independent signals which are less than the number of transmission antennas may be transmitted using the plurality of transmission antennas. For example, four transmission antennas are used, and two independent signals are transmitted to the wireless reception device.

Moreover, in each of the above described embodiments, it is also possible to control the wireless transmission device and the wireless reception device by recording on a computer-readable recording medium a program which realizes the functions or a portion of the functions of each section of the wireless transmission device (see FIG. 1, FIG. 7, FIG. 12) and each section of the wireless reception device (see FIG. 2, FIG. 8, FIG. 13, FIG. 17) of the first through fourth embodiments, and by causing this program recorded on a recording medium to be read and executed by a computer system. Note that, here, 'computer system' includes the OS and hardware such as peripheral devices and the like.

Moreover, 'computer readable recording medium' refers to a storage medium such as a portable medium such as a flexible disc, a magneto-optical disc, ROM, or CD-ROM, or hard disc incorporated in a computer system or the like. Furthermore, 'computer readable recording medium' also includes devices that hold a program dynamically for short periods of time such as communication lines when the program is transmitted via a network such as the Internet or via a communication circuit such as a telephone line, and includes devices which hold a program for a fixed period of time such as the volatile memory incorporated in computer systems which form the servers and clients in the case of the communication lines or networks described above. The above described program may realize a portion of the above described functions or may realize the above described functions in combination with a program which has already been recorded on a computer system.

Embodiments of this invention have been described in detail above with reference made to the drawings, however, the specific structure of this invention is not limited to these embodiments and other designs and the like are also included insofar as they do not depart from the spirit or scope of this invention.

INDUSTRIAL APPLICABILITY

The present invention provides a wireless reception device, a wireless communication system and a wireless communication method which make it possible to obtain good channel characteristics between the wireless transmission device and the wireless reception device without increasing the number of reception antennas of the wireless reception device.

The invention claimed is:

1. A wireless reception device which communicates with a wireless transmission device which has a plurality of transmission antennas, the wireless reception device comprising:
   at least one reception antenna configured to receive a plurality of transmission signals transmitted from the plurality of transmission antennas of the wireless transmission device;
   a channel response estimation unit configured to estimate a channel response between the plurality of transmission antennas and the at least one reception antenna;
   a block dividing unit configured to divide a reception signal of the at least one reception antenna into a plurality of blocks, based on multi paths;
   a signal detection unit configured to detect the plurality of transmission signals transmitted by the wireless transmission device based on the reception signal corresponding to the plurality of blocks divided by the block dividing unit and the channel response estimated by the channel response estimation unit, and to calculate a bit likelihood based on the reception signal received by the at least one reception antenna; and
   a reception replica signal generation unit configured to generate a reception replica signal based on the channel response estimated by the channel response estimation unit and the bit likelihood calculated by the signal detection unit,
   wherein the block dividing unit divides the reception signal of the at least one reception antenna into the plurality of blocks using the reception replica signal generated by the reception replica generation unit.

2. The wireless reception device according to claim 1, wherein the block dividing unit divides such that the total number of blocks divided in the at least one reception antenna is same or greater than the number of the plurality of transmission antennas.

3. The wireless reception device according to claim 1, wherein the signal detection unit converts the estimated channel responses into signals which correspond to the plurality of blocks divided by the block dividing unit, and separates a plurality of converted channel responses by zero forcing criteria.

4. The wireless reception device according to claim 1, wherein the signal detection unit converts the estimated channel responses into signals which correspond to the plurality of blocks divided by the block dividing unit, and separates a plurality of converted channel responses by minimum mean square error (MMSE) criteria.

5. The wireless reception device according to claim 1, wherein
   the block dividing unit comprises a fourier conversion unit configured to convert the reception signal into frequency region signals, and
   the signal detection unit comprises:
   a signal separation unit configured to calculate the plurality of transmission signals transmitted by the plurality of transmission antennas based on the frequency region signals into which the reception signal was converted by the fourier conversion unit;
   a demodulation unit configured to calculate the bit likelihood based on the plurality of transmission signals calculated by the signal separation unit; and
   a decoding unit configured to perform an error correction decoding process for the bit likelihood calculated by the demodulation unit.

6. The wireless reception device according to claim 1, wherein
   the block dividing unit comprises a fourier conversion unit configured to convert the reception signal into frequency region signals, and
   the signal detection unit comprises:
   a signal separation unit configured to calculate the plurality of transmission signals transmitted by the plurality of transmission antennas based on the frequency region signals into which the reception signal was converted by the fourier conversion unit;
   an inverse fourier conversion unit configured to convert the plurality of transmission signals calculated by the signal separation unit into time region signals;
   a demodulation unit configured to calculate the bit likelihood based on the time region signals converted by the inverse fourier conversion unit; and
   a decoding unit configured to perform an error correction decoding process for the bit likelihood calculated by the demodulation unit.

7. The wireless reception device according to claim 6, wherein
   the signal detection unit converts the estimated channel responses into signals which correspond to the plurality of blocks divided by the block dividing unit, and separates a plurality of multiplexed transmission signals based on the converted channel response and code multiplex number.

8. The wireless reception device according to claim 7, wherein the signal detection unit separates the plurality of multiplexed transmission signals based on the converted channel and code multiplex number by zero forcing criteria.

9. The wireless reception device according to claim 7, wherein the signal detection unit separates the plurality of multiplexed transmission signals based on the converted channel and code multiplex number by minimum mean square error (MMSE) criteria.

10. The wireless reception device according to claim 1, wherein the plurality of transmission signals are spread and code multiplexed, wherein
    the block dividing unit comprises a fourier conversion unit configured to convert the reception signal into frequency region signals, and
    the signal detection unit comprises:
    a signal separation unit configured to calculate the plurality of transmission signals transmitted by the plurality of transmission antennas based on the frequency region signals into which the reception signal was converted by the fourier conversion unit;
    an inverse spreading unit configured to perform inverse spreading for the plurality of transmission signals calculated by the signal separation unit;
    a demodulation unit configured to calculate the bit likelihood based on the plurality of transmission signals to which the inverse spreading unit performs the inverse spreading; and
    a decoding unit configured to perform an error correction decoding process for the bit likelihood calculated by the demodulation unit.

11. The wireless reception device according to claim 2, wherein the signal detection unit converts the estimated channel responses into signals which correspond to the plurality of blocks divided by the block dividing unit, and separates a plurality of converted channel responses by zero forcing criteria.

12. The wireless reception device according to claim 2, wherein the signal detection unit converts the estimated channel responses into signals which correspond to the plurality of blocks divided by the block dividing unit, and separates the plurality of converted channel responses by minimum mean square error (MMSE) criteria.

13. The wireless reception device according to claim 2, wherein the block dividing unit comprises a fourier conversion unit configured to convert the reception signal into frequency region signals, and the signal detection unit comprises:
- a signal separation unit configured to calculate the plurality of transmission signals transmitted by the plurality of transmission antennas based on the frequency region signals into which the reception signal was converted by the fourier conversion unit;
- a demodulation unit configured to calculate the bit likelihood based on the plurality of transmission signals calculated by the signal separation unit; and
- a decoding unit configured to perform an error correction decoding process for the bit likelihood calculated by the demodulation unit.

14. A wireless communication system which comprises a wireless transmission device and a wireless reception device;

the wireless transmission device comprising
a plurality of transmission antennas; and
a transmission unit configured to transmit a plurality of transmission signals using the plurality of transmission antennas, the wireless reception device comprising:
- at least one reception antenna configured to receive the plurality of transmission signals transmitted from the plurality of transmission antennas of the wireless transmission device;
- a channel response estimation unit configured to estimate a channel response between the plurality of transmission antennas and the at least one reception antenna;
- a block dividing unit configured to divide a reception signal of the at least one reception antenna into a plurality of blocks, based on multi paths;
- a signal detection unit configured to detect the plurality of transmission signals transmitted by the wireless transmission device based on the reception signal corresponding to the plurality of blocks divided by the block dividing unit and the channel response estimated by the channel response estimation unit, and to calculate a bit likelihood based on the reception signal received by the at least one reception antenna; and
- a reception replica signal generation unit configured to generate a reception replica signal based on the channel response estimated by the channel response estimation unit and the bit likelihood calculated by the signal detection unit, wherein the block dividing unit divides the reception signal of the at least one reception antenna into the plurality of blocks using the reception replica signal generated by the reception replica generation unit.

15. A wireless communication method used by a wireless reception device, which has at least one reception antenna, which communicates with a wireless transmission device which has a plurality of transmission antennas, the wireless communication method comprising:
- receiving, by the at least one reception antenna, a plurality of transmission signals transmitted from the plurality of transmission antennas of the wireless transmission device;
- estimating a channel response between the plurality of transmission antennas and the at least one reception antenna;
- dividing a reception signal of the at least one reception antenna into a plurality of blocks;
- detecting the plurality of transmission signals transmitted by the wireless transmission device based on the reception signal corresponding to the divided plurality of blocks and the estimated channel response;
- calculating a bit likelihood based on the reception signal received by the at least one reception antenna; and
- generating a reception replica signal based on the estimated channel response and the calculated bit likelihood, wherein the division of the reception signal of the at least one reception antenna into the plurality of blocks is made by using the generated reception replica signal.

16. The wireless communication method according to claim 15, wherein the block division and the transmission signal detection are performed repeatedly.

\* \* \* \* \*